US008751559B2

(12) United States Patent
Richardson et al.

(10) Patent No.: US 8,751,559 B2
(45) Date of Patent: Jun. 10, 2014

(54) BALANCED ROUTING OF QUESTIONS TO EXPERTS

(75) Inventors: Matthew Richardson, Seattle, WA (US); Ryen W. White, Kirkland, WA (US); Eric D. Brill, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 12/211,113

(22) Filed: Sep. 16, 2008

(65) Prior Publication Data
US 2010/0070554 A1     Mar. 18, 2010

(51) Int. Cl.
*G06F 15/16*     (2006.01)

(52) U.S. Cl.
USPC ....................................................... 709/202

(58) Field of Classification Search
USPC .......... 709/202, 203, 217, 223, 224; 705/1, 2, 705/3, 4, 7, 8–9, 10; 706/45–62
See application file for complete search history.

(56) References Cited

U.S. PATENT DOCUMENTS

| | | | |
|---|---|---|---|
| 5,063,600 A | 11/1991 | Norwood | |
| 5,146,552 A | 9/1992 | Cassorla et al. | |
| 5,708,825 A | 1/1998 | Sotomayor | |
| 5,732,399 A | 3/1998 | Katiyar et al. | |
| 5,761,436 A | 6/1998 | Nielsen | |
| 5,806,079 A | 9/1998 | Rivette et al. | |
| 5,996,006 A | 11/1999 | Speicher | |
| 6,011,537 A | 1/2000 | Slotznick | |
| 6,064,978 A * | 5/2000 | Gardner et al. ................ 705/10 |
| 6,065,001 A | 5/2000 | Ohkubo et al. | |
| 6,072,493 A | 6/2000 | Driskell et al. | |
| 6,088,026 A | 7/2000 | Williams | |
| 6,199,080 B1 | 3/2001 | Nielsen | |
| 6,243,722 B1 | 6/2001 | Day et al. | |
| 6,347,398 B1 | 2/2002 | Parthasarathy et al. | |
| 6,356,922 B1 | 3/2002 | Schilit et al. | |
| 6,496,931 B1 | 12/2002 | Rajchel et al. | |

(Continued)

FOREIGN PATENT DOCUMENTS

| | | |
|---|---|---|
| EP | 0913779 | 6/1999 |
| JP | 2001022788 | 1/2001 |

(Continued)

OTHER PUBLICATIONS

Kwok, et al., "Scaling Question Answering to the Web," accessible at <<http://www.cs.washington.edu/homes/weld/papers/mulder-www10.pdf>>, Nov. 13, 2000, pp. 1-22.

(Continued)

*Primary Examiner* — Ruolei Zong
(74) *Attorney, Agent, or Firm* — Dan Choi; Carole Boelitz; Micky Minhas

(57) ABSTRACT

A question processing system routes questions among participants in a balanced and sustainable manner. Any participant can act as an inquirer (who poses questions) and an expert (who answers questions). In one illustrative case, the question processing system operates by: receiving a question from an inquirer; determining at least one expert that is appropriate to answer the question; and routing the question to the expert. The receiving, determining, and routing are repeated with respect to other inquirers and other experts to achieve a desired balance of information exchange among the plurality of participants of the electronic question processing system.

21 Claims, 14 Drawing Sheets

(56) References Cited

U.S. PATENT DOCUMENTS

| | | |
|---|---|---|
| 6,513,013 B1 | 1/2003 | Stephanou |
| 6,535,889 B1 | 3/2003 | Headrick et al. |
| 6,549,916 B1 | 4/2003 | Sedlar |
| 6,598,046 B1 | 7/2003 | Goldberg et al. |
| 6,654,725 B1 | 11/2003 | Langheinrich et al. |
| 6,687,878 B1 | 2/2004 | Eintracht et al. |
| 6,724,403 B1 | 4/2004 | Santoro et al. |
| 6,728,752 B1 | 4/2004 | Chen et al. |
| 6,804,659 B1 | 10/2004 | Graham et al. |
| 6,829,585 B1 | 12/2004 | Grewal et al. |
| 6,847,959 B1 | 1/2005 | Arrouye et al. |
| 6,865,713 B1 | 3/2005 | Bates et al. |
| 6,901,394 B2* | 5/2005 | Chauhan et al. ............... 706/60 |
| 6,938,022 B1 | 8/2005 | Singhal |
| 6,956,593 B1 | 10/2005 | Gupta et al. |
| 6,957,233 B1 | 10/2005 | Beezer et al. |
| 7,013,478 B1 | 3/2006 | Hendricks et al. |
| 7,058,726 B1 | 6/2006 | Osaku et al. |
| 7,062,510 B1 | 6/2006 | Eldering |
| 7,072,888 B1 | 7/2006 | Perkins |
| 7,107,518 B2 | 9/2006 | Ramaley et al. |
| 7,143,091 B2 | 11/2006 | Charnock et al. |
| 7,280,995 B1 | 10/2007 | Sedlar |
| 7,319,992 B2 | 1/2008 | Gaos |
| 7,392,185 B2 | 6/2008 | Bennett |
| 7,409,384 B2 | 8/2008 | Szeto et al. |
| 7,596,578 B1* | 9/2009 | Marks ................................... 1/1 |
| 7,653,627 B2 | 1/2010 | Li et al. |
| 7,668,748 B1 | 2/2010 | Veach |
| 7,756,756 B1* | 7/2010 | Lifson ............................ 705/26 |
| 8,069,194 B1 | 11/2011 | Manber et al. |
| 2001/0032244 A1* | 10/2001 | Neustel ........................ 709/206 |
| 2001/0042098 A1 | 11/2001 | Gupta et al. |
| 2002/0001436 A1 | 1/2002 | Park |
| 2002/0032839 A1 | 3/2002 | Yamamoto et al. |
| 2002/0052925 A1 | 5/2002 | Kim et al. |
| 2002/0055880 A1 | 5/2002 | Unold et al. |
| 2002/0078088 A1 | 6/2002 | Kuruoglu et al. |
| 2002/0081020 A1 | 6/2002 | Shimazu |
| 2002/0133628 A1 | 9/2002 | Asplund et al. |
| 2002/0154157 A1 | 10/2002 | Sherr et al. |
| 2003/0023679 A1 | 1/2003 | Johnson et al. |
| 2003/0093276 A1 | 5/2003 | Miller et al. |
| 2003/0101104 A1 | 5/2003 | Dimitrova et al. |
| 2003/0149694 A1 | 8/2003 | Ma et al. |
| 2004/0019610 A1 | 1/2004 | Burns |
| 2004/0044542 A1 | 3/2004 | Beniaminy et al. |
| 2004/0059708 A1 | 3/2004 | Dean et al. |
| 2004/0066531 A1 | 4/2004 | Kim |
| 2004/0122912 A1 | 6/2004 | Kim et al. |
| 2004/0133468 A1 | 7/2004 | Varghese |
| 2004/0138946 A1 | 7/2004 | Stolze |
| 2004/0163042 A1 | 8/2004 | Altman |
| 2004/0167928 A1 | 8/2004 | Anderson et al. |
| 2004/0250201 A1 | 12/2004 | Caspi |
| 2004/0260702 A1 | 12/2004 | Cragun et al. |
| 2005/0022122 A1 | 1/2005 | Barrus et al. |
| 2005/0027696 A1 | 2/2005 | Swaminathan et al. |
| 2005/0028200 A1 | 2/2005 | Sardera |
| 2005/0038814 A1 | 2/2005 | Iyengar et al. |
| 2005/0050097 A1 | 3/2005 | Yeh et al. |
| 2005/0075886 A1* | 4/2005 | LeFebvre et al. ............. 704/276 |
| 2005/0078190 A1 | 4/2005 | Bloom et al. |
| 2005/0091106 A1 | 4/2005 | Reller et al. |
| 2005/0096979 A1 | 5/2005 | Koningstein |
| 2005/0097440 A1 | 5/2005 | Lusk et al. |
| 2005/0144064 A1 | 6/2005 | Calabria et al. |
| 2005/0160113 A1 | 7/2005 | Sipusic et al. |
| 2005/0183005 A1 | 8/2005 | Denoue et al. |
| 2005/0192822 A1 | 9/2005 | Hartenstein et al. |
| 2005/0222989 A1 | 10/2005 | Haveliwala et al. |
| 2005/0246736 A1 | 11/2005 | Beyda et al. |
| 2005/0256866 A1 | 11/2005 | Lu et al. |
| 2005/0289452 A1 | 12/2005 | Kashi et al. |
| 2006/0004711 A1 | 1/2006 | Naam |
| 2006/0041830 A1 | 2/2006 | Bohn |
| 2006/0047615 A1* | 3/2006 | Ravin et al. ..................... 706/50 |
| 2006/0129536 A1 | 6/2006 | Foulger et al. |
| 2006/0149817 A1 | 7/2006 | Bou-Ghannam et al. |
| 2006/0218153 A1 | 9/2006 | Voon et al. |
| 2006/0242574 A1 | 10/2006 | Richardson et al. |
| 2007/0011155 A1 | 1/2007 | Sarkar |
| 2007/0174265 A1 | 7/2007 | Gorti et al. |
| 2007/0179945 A1 | 8/2007 | Marston et al. |
| 2007/0219794 A1* | 9/2007 | Park et al. ..................... 704/246 |
| 2007/0233658 A1 | 10/2007 | Coughlin et al. |
| 2007/0259325 A1* | 11/2007 | Clapper ........................ 434/350 |
| 2008/0104004 A1 | 5/2008 | Brave et al. |
| 2008/0162454 A1 | 7/2008 | Lundell et al. |
| 2008/0235189 A1 | 9/2008 | Rayman et al. |
| 2008/0294584 A1 | 11/2008 | Herz |
| 2008/0306935 A1 | 12/2008 | Richardson et al. |
| 2009/0080635 A1* | 3/2009 | Altberg et al. ............ 379/216.01 |
| 2009/0307100 A1* | 12/2009 | Nguyen et al. .................. 705/26 |

FOREIGN PATENT DOCUMENTS

| | | |
|---|---|---|
| JP | 2001142830 | 5/2001 |
| JP | 2001282092 | 10/2001 |
| JP | 2003178075 | 6/2003 |
| JP | 2004509415 | 3/2004 |
| JP | 2004348241 | 12/2004 |
| JP | 2005031780 | 2/2005 |
| KR | 20030082110 A | 10/2003 |
| WO | WO97/22109 | 6/1997 |
| WO | WO00/77690 | 12/2000 |
| WO | WO01/09738 A1 | 2/2001 |
| WO | WO01/42980 | 6/2001 |
| WO | WO01/98911 A1 | 12/2001 |
| WO | WO02/35324 | 5/2002 |
| WO | WO02101483 A2 | 12/2002 |
| WO | WO03/023631 | 3/2003 |
| WO | WO2004079522 A2 | 9/2004 |
| WO | WO2005/089291 | 9/2005 |
| WO | WO2005/096750 | 10/2005 |
| WO | WO2008150672 | 12/2008 |

OTHER PUBLICATIONS

Leidner, et al., "Evaluating Question Answering Systems Using FAQ Answer Injection," Proceedings of the 6th Annual CLUK Research Colloquium, accessible at <<http://www.cs.jhu.edu/~ccb/publications/evaluating-question-answering-systems-using-faq-answer-injection.pdf>>, 2003, 6 pages.

Cowie, et al., "Automatic Question Answering," Proceedings of RIAO '2000, accessible at <<http://ilit.umbc.edu/SergeiPub/AutomaticQA2000.pdf>>, 2000, 10 pages.

Maybury, et al., "Virtually Integrated Visionary Intelligence Demonstration (VIVID)," accessible at <<https://analysis.mitre.org/proceedings/Final_Papers_Files/271_Camera_Ready_Paper.pdf>>, 2005, 6 pages.

Vijayakumar, et al., "Digital Reference Service: Libraries Online 24/7," accessible at <<http://eprints.rclis.org/archive/00005667/01/vijayakumarjk_16.pdf>>, Proceedings of SIS-2005, Visakhapatanam, 2005, 5 pages.

Yahoo Answers home page, accessible at <<http://answers.yahoo.com/>>, accessed on Sep. 15, 2008, 2 pages.

Windows Live QnA home page, accessible at <<http://qna.live.com/>>, accessed on Sep. 15, 2008, 2 pages.

Ask.com home page, accessible at <<http://www.ask.com/>>, accessed on Sep. 15, 2008, 1 page.

ChaCha.com home page, accessible at <<http://www.chacha.com/>>, accessed on Sep. 15, 2008, 2 pages.

Translated Japanese Office Action mailed Nov. 9, 2012 for Japanese patent application No. 2008-508880, a counterpart foreign application of US paten No. 7,734,631, 6 pages.

Office action for U.S. Appl. No. 12/389,390, mailed on Nov. 15, 2012, Imig et al., "Identifying a Discussion Topic Based on User Interest Information", 12 pages.

Office action for U.S. Appl. No. 12/796,379, mailed on May 24, 2013, Richardson et al., "Associating information with an electronic document", 25 pages.

(56) References Cited

OTHER PUBLICATIONS

Office action for U.S. Appl. No. 12/389,390, mailed on Jun. 28, 2013, Imig et al., "Identifying a Discussion Topic Based on User Interest Information", 13 pages.
The Japanese Office Action mailed Jun. 15, 2012 for Japanese patent application No. 2008-508880, a counterpart foreign application of US patent No. 7,734,631, 6 pages.
The Korean Office Action mailed Aug. 13, 2012 for Korean patent application No. 10-2007-7024625, a counterpart foreign application of US patent No. 7,734,631, 4 pages.
Office action for U.S. Appl. No. 12/796,379, mailed on Aug. 1, 2012, Richardson et al., "Associating information with an electronic document", 30 pages.
The Mexican Office Action received Apr. 24, 2012 for Mexican patent application No. MX/a/2007/013091, a counterpart foreign application of US patent No. 7,734,631, 3 pages.
Office Action for U.S. Appl. No. 12/796,379, mailed on Apr. 13, 2012, Matthew R. Richardson, "Associating information with an electronic document", 29 pgs.
Translated Japanese Office Action mailed Sep. 16, 2011 for Japanese patent application No. 2008-508880, a counterpart foreign application of US patent No. 7,734,631, 5 pages.
Amershi, et al., "CoSearch: A System for Co-located Collaborative Web Search," Proceeding of the Twenty-Sixth Annual SIGCHI Conference on Human Factors in Computing Systems, 2008, accessible at <<http://research.microsoft.com/en-us/um/people/merrie/papers/cosearch.pdf>>, 10 pages.
Busnel, et al., "PROXSEM: Interest-based Proximity Measure to Improve Search Efficiency inP2P Systems," Proceedings of the Fourth European Conference on Universal Multiservice Networks (ECUMN'07), 2007, accessible at http://www.irisa.fr/asap/intraneUproxsem-interest-based-proximity-measure-to-improve-search-efficiency-in-p2p-systems.pdf/attachment_download/file, 10 pages.
Chellapilla, et al., Improving Cloaking Detection Using Search Query Popularity and Monetizability, http://research.microsoft.com/~kumarc/pubs/chellapilla_airweb2006.pdf, Aug. 10, 2006, 7 pages, AIRWeb'06 Seattle, Washington, USA.
Chiou, et al., "Interest-based Peer Selection in P2P Network," Proceedings of the 2008 IEEE International Conference on Sensor Networks, Ubiquitous, and Trustworthy Computing, 2008, accessible at ftp:llftp.computer. org/press/outgoing/proceedings/sutc08/data/3158a549.pdf, 6 pages.
Freyne, et al., "Collecting Community Wisdom: Integrating Social Search & Social Navigation," Proceedings of the 12th international conference on Intelligent user interlaces, 2007, 10 pages.
Freyne, et al., "Toward the Exploitation of Social Access Patterns for Recommendation," Proceedings of the 2007 ACM Conference on Recommender Systems, accessible at http://www.csLucd.ie/UserFiles/publications/1182162672681.pdf, 2007, 4 pages.
Gaim-Encryption, Product Manual (Online), retrieved from http://www.gaim-encryption.sourceforge.net/>, Jan. 25, 2008, 1 page (Gaim-Encryption is now Pidgin-Encryption—http://sourceforge.net/projects/gaim-encryption).
Garner, et al., "Integrating Search and Social Media," accessible at http://www.icrossing.com/articlesIIntegrating%20Search%20and%20Social%20Media.pdf, Sep. 15, 2008, 8 pages.
Godoy, et al., "An Agent-Based Recommender System to Support Collaborative Web Search Based on Shared User Interests," J.M. Haake, S.F. Ochoa, and A. Cechich (Eds.), CRIWG 2007, LNCS 4715, Springer-Verlag Berlin Heidelberg, 2007, pp. 303-318.

Goodman, et al., Implicit Queries for Email, in Proceedings CEAS, 2005, accessible from http://www.cs.cmu.edu/~vitor/papers/ceas05.pdf, 9 pages.
Morris, Meredith Ringel, "A Survey of Collaborative Web Search Practices," Proceeding of the Twenty-Sixth Annual 12 SIGCHI Conference on Human Factors in Computing Systems, 2008, 4 pages.
Morris, et al., "Enhancing Collaborative Web Search with Personalization: Groupization, Smart Splitting, and Group Hit-Highlighting," Proceedings of the ACM 2008 Conference on Computer Supported Cooperative Work, 2008, accessible at http://research.microsoft.com/en-us/um/people/merrie/papers/groupization_cscw08.pdf, 4 pages.
Morris, Meredith Ringel, "Interfaces for Collaborative Exploratory Web Search: Motivations and Directions for Multi-User Designs," CHI 2007 Workshop on Exploratory Search and HCI, 2007, accessible at http://research.microsoft.com/en-us/um/people/merrie/papers/merrie _exploratory_search wkshop _camera ready. pdf, 4 pages.
Morris, et al., "S3: Storable, Shareable Search," Interact 2007, accessible at http://research.microsoft.com/ en-us/um/people/horvitzls3.pdf, 4 pages.
Morris, et al., "SearchBar: A Search-Centric Web History for Task Resumption and Information Re-finding," Proceeding of the Twenty-Sixth Annual SIGCHI Conference on Human Factors in Computing Systems, 2008, Accessible at http://research.microsoft.com/apps/pubs/default.aspx?id=64276, 10 pages.
Morris, et al., "SearchTogether: An Interface for Collaborative Web Search," Proceedings of the 20th Annual ACM Symposium on User interface Software and Technology, 2007, 10 pages.
Morris, et al., "Shared Sensemaking: Enhancing the Value of Collaborative Web Search Tools," CHI 2008 Workshop on Sensemaking, 2008, 5 pages.
The Mexican Office Action mailed Apr. 18, 2011 for Mexican patent application No. MX/a/2007/013091, a counterpart foreign application os US patent No. 7,734,631, 6 pages.
Noda, et al., Benchmark Study of Desktop Search Tools, http://www.uwebc.org/opinionpapers/archives/docs/desktop_search_04282005.pdf, Apr. 20, 2005, 15 pages, UW E-Business Consortium, University of Wisconsin-Madison.
Office Action for U.S. Appl. No. 11/761,047, mailed on May 13, 2011, Matthew R. Richardson, "Using Joint Communication and Search Data", 15 pages.
RaptiveX RapEngine ActiveX Instant Messaging OCX'. Datasheet (Online), Rapman.com, Aug. 3, 1999, retrieved Jul. 1, 2007. http:/www.freedownloadscenter.com/Network_and_Internet/Conferencing_and_Collaboration_Tools/RaptiveX_RapEngine_ActiveX_Instant_Messaging_OCX.html, 2 pages.
Rayan, et al., "Personalized Content Search and Retrieval in an Interest Group Environment," 2007, accessible at <<http://www.hipc.org/hipc2007/posters/content-search.pdf>>, 4 pages.
Zhang, et al., "Building Interest-Oriented Web Search Union," Seventh International Conference on Parallel and Distributed Computing, Applications and Technologies, 2006, Dec. 2006, pp. 327-332.
Singh, et al., "Determining User's Interest in Real Time," Proceeding of the 17th international conference on World Wide Web, 2008, accessible at <<http://www2008.org/papers/pdf/p1115-sanasam.pdf>>, 2 pages.
Weikum, et al., Towards Self-Organizing Query Routing and Processing for Peer-to-Peer Web Search, European Conference on Complex Systems, Nov. 14, 2005, 19 pages.
Office action for U.S. Appl. No. 12/796,379, mailed on Nov. 27, 2013, Richardson, et al., "Associating information with an electronic document", 25 pages.

* cited by examiner

BALANCED ROUTING OF QUESTIONS TO EXPERTS

BACKGROUND

Different systems exist for allowing inquirers to interact with experts. As broadly used herein, an inquirer corresponds to any person (or entity) that poses a question. An expert corresponds to any person (or any entity) that possesses sufficient knowledge to provide an answer to the inquirer's question.

In one system, an inquirer can post a question to a network-accessible forum. An expert can visit the forum and respond to the question. The inquirer can then return to the forum at a later time to receive the expert's answer. This approach is not fully satisfactory because it requires the inquirer to manually identify an appropriate forum; it further requires the expert to manually seek out relevant questions. There is no assurance that the inquirer will find an appropriate forum or that an appropriate expert will discover the question within the forum. Further, there may be large spans of time separating key events in this system; this aspect makes it difficult to achieve a fluid interaction between inquirer and expert.

In another system, an inquirer may send a question via Email to a group of individuals identified by a mailing list. Any of the recipients may choose to respond to the Email message. This approach is not fully satisfactory because it potentially may send the question to a large group of people. This distribution may have the effect of disturbing more people than is necessary, as well as failing to narrowly target those people that are in the best position to answer the question. This approach may also result in the inquirer being deluged with too many answers, many of which may be duplicative or not otherwise useful.

In another system, an inquirer may send a question to a team of experts who are financially compensated to respond the question. This type of expert may perform a network search to generate an answer to the question and then send the answer to the inquirer. This approach may not be fully satisfactory because there is no assurance that the system will send the question to an expert who is a priori knowledgeable in the field to which the question pertains. Moreover, if this type of expert is simply performing a conventional Internet search, this approach may fail to convey information to the inquirer which she could not readily discover by herself.

The literature has recently proposed systems which attempt to automatically route questions to appropriate experts. These proposed approaches may address various shortcomings identified above, but these approaches may also not be fully satisfactory. For instance, these approaches may fail to manage the flow of information among inquirers and experts in an efficient manner.

SUMMARY

A question processing system is described for routing questions among participants in a balanced and sustainable manner. Any participant can act as an inquirer (who poses questions) or an expert (who answers questions) at any given time. In one illustrative case, the question processing system operates by: receiving a question from an inquirer; determining one or more experts that are appropriate to answer the question; and routing the question to the selected expert or group of experts. (In the remainder of this Summary section, the selected expert will be referred to in the singular to facilitate explanation; but the question processing system can also select multiple experts. In the case that multiple experts are selected, each can receive an invitation to answer the question.)

According to one illustrative implementation, the receiving, determining, and routing are repeated with respect to other inquirers and other experts to achieve a desired balance of information exchange among the plurality of participants of the question processing system.

According to another illustrative aspect, a query interpretation module may be used to interpret a submitted question to determine a subject matter to which the question pertains.

According to another illustrative aspect, the question processing system can select the expert from among a plurality of expert candidates based on an analysis of the expertise possessed by the expert candidates (e.g., as reflected by profiles associated with the expert candidates). The analysis of the expertise of the expert candidates may be performed relative to a baseline associated with the expertise possessed by the inquirer, e.g., so as to identify an expert that has an appropriate level of knowledge to converse with the particular inquirer who has posed the question.

According to another illustrative aspect, the expert can also be selected from among the plurality of expert candidates based on an analysis of one or more supplemental considerations. Such supplemental considerations may include any combination of: availability factors associated with the expert candidates; rating scores associated with the expert candidates; disturbance level factors associated with the expert candidates; engagement balance factors associated with the expert candidates, and so on (this enumeration not being exhaustive).

According to another illustrative aspect, the above-identified engagement balance factors identify the degree of prior engagement of each of the plurality of expert candidates in asking and answering questions. These factors can be gauged based on a number of points (or, more generally, credit) earned by each expert candidate, wherein each expert candidate can earn a number of points by answering a question, and each expert candidate can expend another number of points in asking a question.

According to another illustrative aspect, the question processing system can operate by receiving a recommendation from an expert that another expert is appropriate to answer the question. In response, the question processing system can route the question to the other expert.

According to another illustrative aspect, the question processing system can initiate a communication session between the inquirer and the expert if the expert agrees to answer the question that was routed to the expert. In one case, this communication session can be conducted using a synchronous communication mechanism (such as, but not limited to, an instant messaging communication system). In another case, the communication session can be conducted using an asynchronous communication mechanism (such as an Email system).

According to another illustrative aspect, the question processing system can operate by receiving an evaluation by the inquirer of the expert. The question processing system can use the evaluation to adjust a profile associated with the expert. An expert's overall rating score can serve as one factor that governs the routing of questions to the expert in the future.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an electronic question processing system ("question processing system" for brevity) for routing questions to experts. In one case, the question processing system automatically or semi-automatically routes questions to the expert or experts that are deemed qualified to address the questions. This aspect of the question processing system may reduce the burden placed on an inquirer in finding an appropriate expert to answer the question; this aspect may also reduce the burden placed on the expert in finding appropriate questions. Further, the question processing system governs the dissemination of questions in such a way as to balance the flow of information among the participants of the system, wherein any participant can act as an inquirer or an expert at any given time. This aspect of the question processing system may provide appropriate incentives for the participants to actively engage in asking and answering questions, while preventing participants from being inappropriately deluged with query-related tasks, or, alternatively, inappropriately "starved" of such tasks. More generally, the concepts disclosed herein may address one or more of the challenges or problems previously noted, but are not limited to addressing all or any of these challenges or problems.

This disclosure is organized as follows. Section A describes an illustrative question processing system for routing information among inquirers and experts. Section B sets forth illustrative methods that explain the operation of the system of Section A. Section C describes illustrative processing functionality that can be used to implement any aspect of the features described in Sections A and B.

Figure 14:
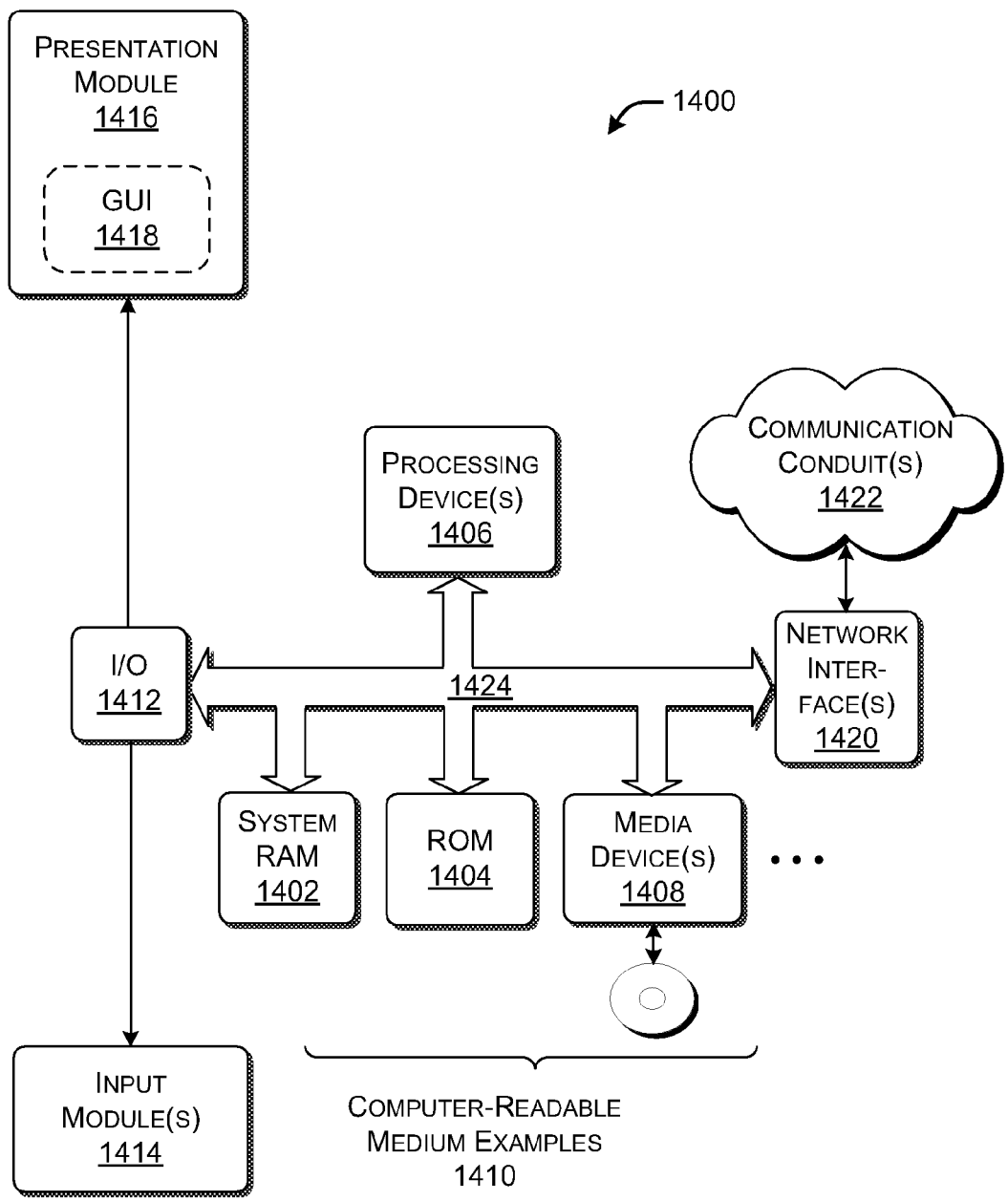
FIG. 14 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 14, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (or can be performed in parallel). The blocks shown in the flowcharts can be implemented by software, firmware, hardware, manual processing, any combination of these implementations, and so on.

As to terminology, the phrase "configured to" encompasses any way that any kind of functionality can be constructed to perform an identified operation. The functionality can be configured to perform an operation using, for instance, hardware, software, firmware, etc., and/or any combination thereof.

The term "logic" encompasses any functionality for performing a task. For instance, each operation illustrated in the flowcharts corresponds to logic for performing that operation. In one case, logic may correspond to computer-readable instructions. In another case, logic may correspond to discrete logic components, or a combination of discrete logic components and computer-readable instructions.

A. Illustrative Systems

Figure 1:
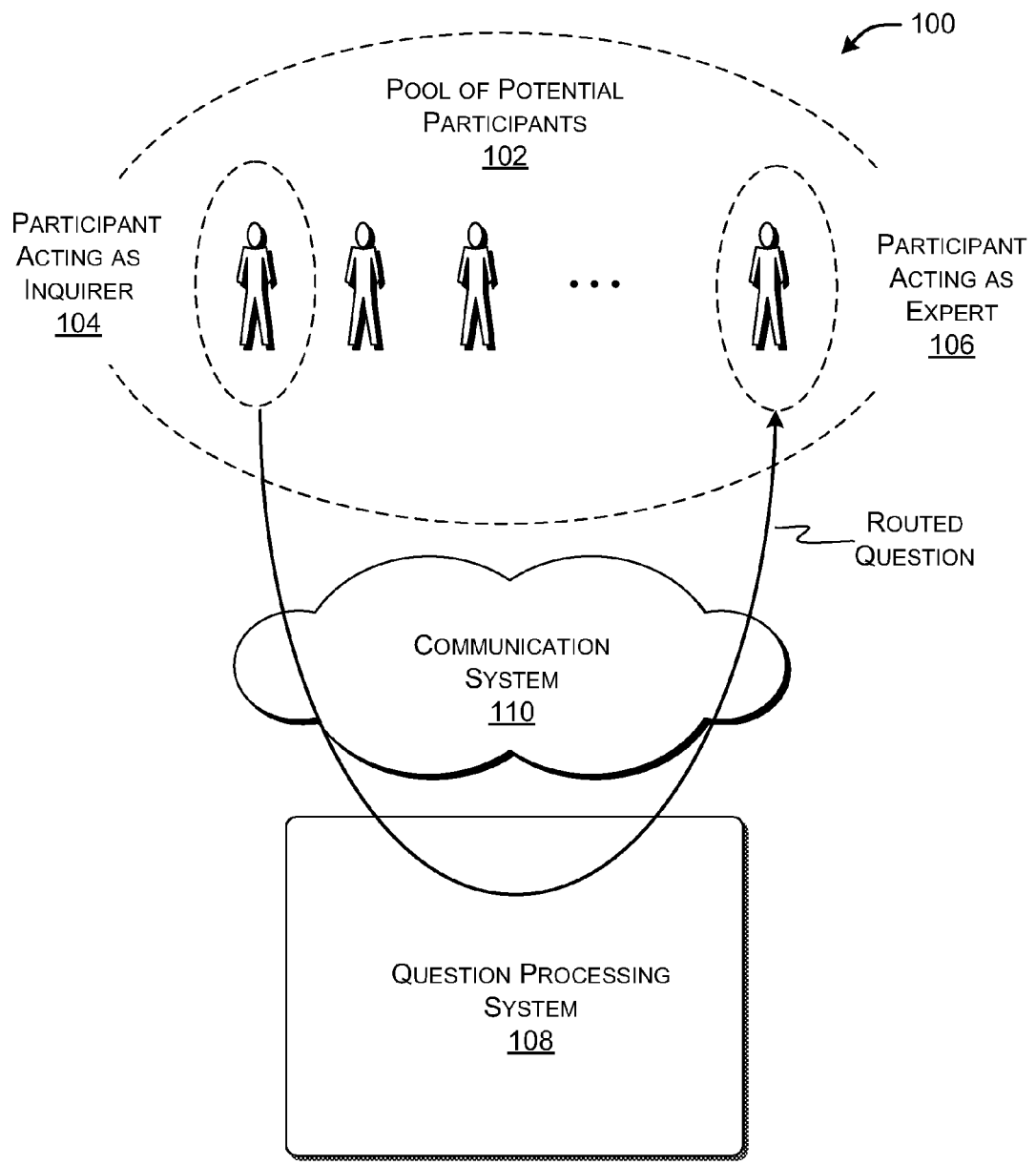
FIG. 1 shows an illustrative environment including a question processing system; the question processing system facilitates the asking and answering of questions over a communication system.

FIG. 1 shows an illustrative environment 100 in which a plurality of participants 102 exchange information with each other. Any participant can act as an inquirer or as an expert at any given time. Any inquirer (e.g., illustrative inquirer 104) is a person (or automated entity or semi-automated entity) that poses a question. The term "question" has broad connotation as used herein. A question may be a directed interrogative, as in "Does anyone know the distance from Seattle to New Orleans?," or a more general request to engage an expert regarding a particular topic, as in "I am interesting in discussing New Orleans with a resident of that city." An expert (such as illustrative expert 106) is a person (or automated entity or semi-automated entity) with sufficient knowledge to answer the question. The term "expert" likewise has broad connotation as used herein. In one interpretation, an expert is anyone that has a greater amount of knowledge regarding a topic (identified by the question) than the inquirer. Thus, expertise is evaluated against a baseline of knowledge possessed by the inquirer. Still more generally, an expert may be considered as any user (or any entity) which acts as a recipient (or a potential recipient) of a question—that is, an answerer.

A question processing system 108 provides the functionality which allows the participants 102 to communicate with each other. Broadly speaking, the question processing system 108 maintains a plurality of profiles which describe the expertise possessed by each of the participants 102, collectively constituting profile information. The question processing system 108 uses this profile information to route a question posed by an inquirer to an appropriate expert. The question processing system 108 can optionally apply one or more supplemental considerations in selecting an expert to answer the question. The detailed operation of the question processing system 108 will be described below in the context of the discussion of FIG. 2.

The question processing system 108 can be physically implemented in different ways. In one case, the question processing system 108 can represent network-accessible functionality, such as one or more server-type computer devices, one or more data stores, and other data processing equipment.

A communication system 110 allows the participants 102 to communicate with the question processing system 108. The communication system 110 can correspond to a wide area network (such as the Internet), a local area network (LAN), a point-to-point connection, or any combination of connectivity mechanisms. The communication system 110 can be physically implemented using any combination of hardwired links, wireless links, name servers, gateways, routers, and so on (not shown). The communication system 110 can be governed by any protocol or combination of protocols.

The environment 100 can correspond to any setting. In one case, the environment 100 can correspond to a wide area network setting in which members of the public can act as participants of the question processing system 108. In another case, the environment 100 can correspond to an organizational setting, such as a company, a governmental institution, an educational institution, and so on. In another case, the environment 100 can correspond to any specialized affiliation of individual participants or institutions. For example, the environment 100 may correspond to a collection of doctors which work in a particular field, or a collection of research institutions that work in the particular field. The environment 100 can correspond to yet other types of settings.

Figure 2:
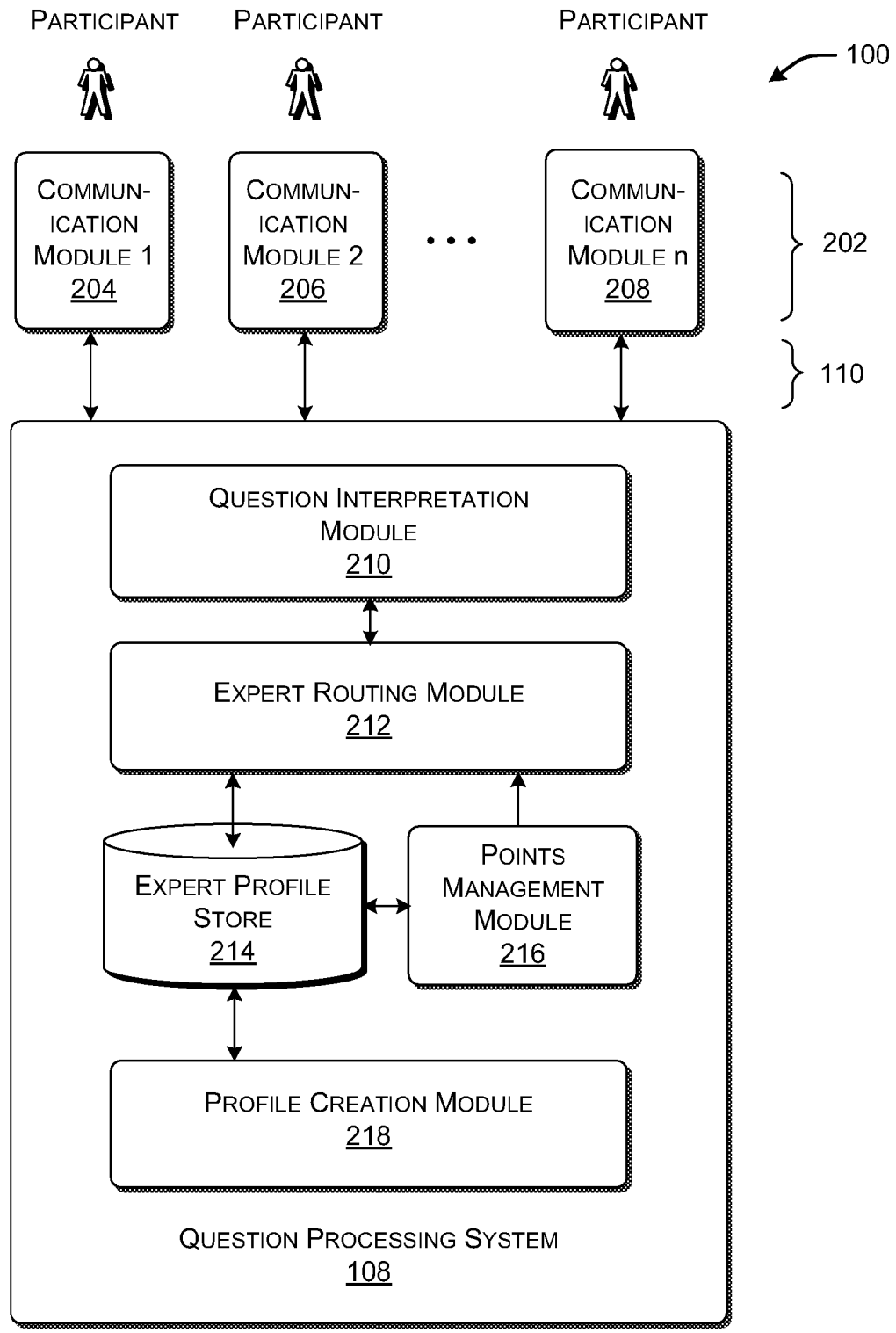
FIG. 2 shows a more detailed depiction of the illustrative question processing system of FIG. 1.

FIG. 2 shows a more detailed depiction of the illustrative environment 100 of FIG. 1. In this figure, a plurality of participants use the question processing system 108 to interact with each other over the communication system 110. The participants can use any type of communication modules 202 to interact with each other. FIG. 2 shows three illustrative communication modules 202, namely, communication module 204, communication module 206, and communication module 208. The communication modules 202 can be implemented using any type of computing device or combination of different types of computing devices, including a personal computer, a laptop computer, a personal digital assistant device, a mobile telephone, a game console, a set-top box, and so on. In one case, each of the communication modules 202 can include local functionality (e.g., a local computer program) which allows it to interact with the question processing system 108. In another case, each of the communication modules 202 includes no such specialized functionality; in one such case, for instance, each of the communication modules 202 can interact with the question processing system 108 using standard browsing functionality (not shown).

The question processing system 108 itself can include (or can be conceptualized to include) a collection of modules that perform various functions. To begin with, the question processing system 108 includes a question interpretation module 210. The question interpretation module 210 is operative to receive and interpret a question posed by an inquirer. The question interpretation module 210 can perform this task in various ways or in various combinations of ways. In one approach, presume that the inquirer enters his or her question in free-form text form. The question interpretation module 210 can extract keywords (where, as used herein, keywords encompass single words, multi-word phrases, and/or other textual information) from the question to determine the subject matter to which the question pertains. To perform this task, the question interpretation module 210 can make reference to a dictionary (not shown) which maps a collection of keywords that may potentially appear in a question with an indication of subject matter to which the question pertains. For example, assume that the participant asks, "How do I cure poison ivy?" The question interpretation module 210 can consult the dictionary to determine that "cure" and "poison ivy" are keywords, and that these keywords map to the subject matter of "health." The question interpretation module 210 also may place particular weight on keywords which appear to identify the names of individuals or places. More generally, the question interpretation module 210 can employ any tool or tools used to interpret free-form text input.

Alternatively, or in addition, the question interpretation module 210 can accept one or more keywords entered by the participant, rather than a free-form question. For example, the participant may simply input "poison ivy" and "itch." The question interpretation module 210 can then map these keywords into an appropriate subject matter classification in the manner explained above.

Alternatively, or in addition, the question interpretation module 210 can accept the question by allowing the inquirer to browse a pre-established subject matter hierarchy. The inquirer can select a topic within the hierarchy which best characterizes his or her question. Alternatively, or in addition, the question interpretation module 210 can allow the inquirer to specify one or more URLs that identify sites that are most pertinent to the nature of the inquirer's question. For example, if the inquirer is interested in a question regarding gardening, he or she may input the URLs of one or more gardening-related sites.

Alternatively, or in addition, a microphone provided by a communication module can capture the participant's question in spoken form. The question interpretation module 210 can employ speech recognition functionality to recognize and interpret the participant's question (or the spoken input can be converted to text at the inquirer's communication module).

Alternatively, or in addition, question interpretation module 210 can provide a more structured way of receiving a participant's question. For example, the question interpretation module 210 can present a structured dialog with the participant which develops the question in a series of steps. For example, assume that the question interpretation module 210 first asks the participant to specify the general category to which the participant's question pertains. Assume that the category "medical" is one option and that the participant selects this option. The question interpretation module 210 can then ask the participant to identify a medical topic to which the question pertains. Assume that the category "dermatology" is one option and that the participant selects this option. This process can be continued until the question interpretation module 210 is confident that it understands the basic nature of the participant's question.

Alternatively, or addition, the question interpretation module 210 can also examine supplemental information regarding the inquirer to help determine the question that the inquirer is asking. For instance, if authorized by the inquirer, the question interpretation module 210 can examine prior questions submitted by the inquirer, documents authored by the inquirer, browsing behavior exhibited by the inquirer, and so on.

The question interpretation module 210 can apply yet other techniques for interpreting the participant's question; the above techniques provide a representative and non-exhaustive sampling of possible techniques.

The question processing system 108 also includes an expert routing module 212. One purpose of the expert routing module 212 is to route an inquirer's question, as interpreted by the question interpretation module 210, to the most appropriate expert or experts. To perform this task, the expert routing module 212 makes reference to an expert profile store 214. The expert profile store 214 stores a plurality of profiles regarding respective participants of the question processing system 108. Among other information, the profiles provide expertise information. The expertise information identifies the expertise of each expert (and recall that any participant of the question processing system 108 can act in the role of an expert). The expert routing module 212 identifies one or more experts that may be appropriate to answer the question by identifying one or more associated profiles which match the subject matter of the question. For example, the subject matter of the question may be identified as dermatology. The expert routing module 212 can identify one or more experts having expertise in dermatology, as can be gleaned from the profiles of these experts.

The above-described matching can be performed in various ways. In one technique, the question is considered akin to a search term query and the profiles stored in the expert profile store 214 are considered akin to documents in a database. In this framework, the expert routing module 212 determines a ranked list of profiles which match the question (using any search algorithm). The top-ranking profiles identify the most appropriate experts to answer the participant's question. In another case, the expert routing module 212 can identify appropriate experts in the manner identified above, that is, by extracting keywords from the question. The expert routing module 212 can then select one or more experts who are associated with a category to which the keywords most closely pertain.

In yet another case, the expert routing module 212 can identify appropriate experts by first determining one or more initial experts in any manner, and then expanding (or propagating) this group of initial experts to identify additional experts who are deemed related to the initial experts. To perform this operation, the expert routing module 212 can assess the extent of the relationships between the initial group of experts and other participants using, for example, organizational hierarchies, social networks, etc. The expert routing module 212 can represent the relationships among participants by assigning weights to links which connect the participants, by associating common keywords and/or other attributes with related participants, and so on. For example, in one illustrative case, an initial group of experts can be expanded to include other participants who have some type of working relationship with the initial group of experts (e.g., managers, subordinates, peers, etc.). Propagation in the manner described above is especially useful if the question processing system 108 maintains profiles for only a subset of participants. The expert routing module 212 can propagate the characteristics of the initial group of experts to related participants, such that the expert routing module 212 produces a larger pool of experts to select from in addressing questions from inquirers. This type of propagation can be performed at the time that a question is submitted, and/or can be performed "offline," e.g., as a general profile management task. Still other techniques exist for matching questions to appropriate experts based on expertise information.

The expert routing module 212 can also perform analysis with respect to one or more supplemental considerations in deciding which expert or experts to route the question to. These supplemental considerations will be described in the context of the discussion of FIG. 4 below.

The question processing system 108 also includes a points management module 216. According to one implementation, the points management module 216 rewards points to participants for engaging in various encouraged activities associated with the operation of the question processing system 108. The term point broadly encompasses any unit (or measure or assessment, etc.) of credit (or value or privilege, etc.) given to a participant. Points may be expressed as integral units, or as a continuous variable, or in some other form or combination of forms. For example, the points management module 216 can reward a number of points to an expert for answering a question. In one optional case, the number of points that are awarded can vary depending on an assessed level of difficulty of the question, and/or the level of satisfaction of the inquirer who receives the answer, and/or based on other factors. The points management module 216 can also award points to a participant who facilitates the flow of information within the question processing system 108. For example, the points management module 216 can award a number of points to someone who recommends another expert to answer a question, to someone who provides useful profile information, to someone who provides a useful evaluation of an expert, and so on.

Similarly, the points management module 216 can deduct points from participants for engaging in various activities associated with the operation of the question processing system 108. For example, the points management module 216 can deduct a number of points from a participant when the participant poses a question. In effect, the participant is "paying for" the privilege of asking a question by expending a number of points. In one approach, each participant is given a predetermined number of points upon initially registering with the question processing system 108. In other cases, a participant can be penalized for engaging in undesirable behavior, such as by providing questions or answers that are considered abusive for any reason.

By virtue of the above provision, the question processing system 108 can maintain a desirable balance of information flow within the question processing system 108. For instance, a participant will be motivated to answer questions to earn points, which enables the participant, in turn, to ask his or her own questions. Here, the term "balance" is to be construed broadly. In one case, a balance is achieved when a participant is asking approximately the same number of questions that he or she is answering.

The above economic strategy can be varied in various ways. In one approach, an inquirer can independently provide payment to receive the right to pose a question to an expert. This payment can be optionally forwarded directly to the expert who successfully answers the question. In this case, there is no need for the inquirer to also answer questions, if, in fact, the inquirer is willing to pay for the privilege of asking questions without fielding questions in turn.

In another case, any participant can redeem the points that he or she has earned for goods, services, cash, etc.

In another case, the points management module 216 can accommodate other balance levels of information flow within the question processing system 108 (that is, other than requiring an inquirer to answer approximately the same number of questions that he or she asks). That is, "balance" does not necessarily connote a 50%-50% type of balance. For example, the points management module 216 can allow some participants to ask more questions than they answer; it can also allow some participants to answer more questions than they ask. For example, a certain participant may register to receive a preferred status (which may require this participant to pay a periodic fee to use the service); this preferred status may entitle the participant to answer fewer questions than he or she asks (or perhaps entitles the participant to answer no questions). A participant without this preferred status may be required to answer approximately as many questions as he or she asks.

In another case, the points management module 216 can be entirely omitted. In this case, an inquirer can ask any number of questions free of charge. Further, an expert can answer any number of questions without receiving any reward. In a variation, the points management module 216 can allow an inquirer to ask a predetermined number of questions within a prescribed time interval (e.g., a day) without charge; if the inquirer exceeds this quota, he or she is asked to expend points (or provide other means of payment) to earn the right to ask additional questions.

Still further economic strategies can be used to provide a desired flow of information among participants of the question processing system 108.

The question processing system 108 can also include a profile creation module 218. The purpose of the profile creation module 218 is to create profiles for each of the participants of the question processing system 108. As described above, the expert routing module 212 can use these profiles to route questions to the appropriate experts. The profile creation module 218 stores the profiles that it creates in the expert profile store 214. The profile creation module 218 also updates profiles that it has previously created.

Figure 3:
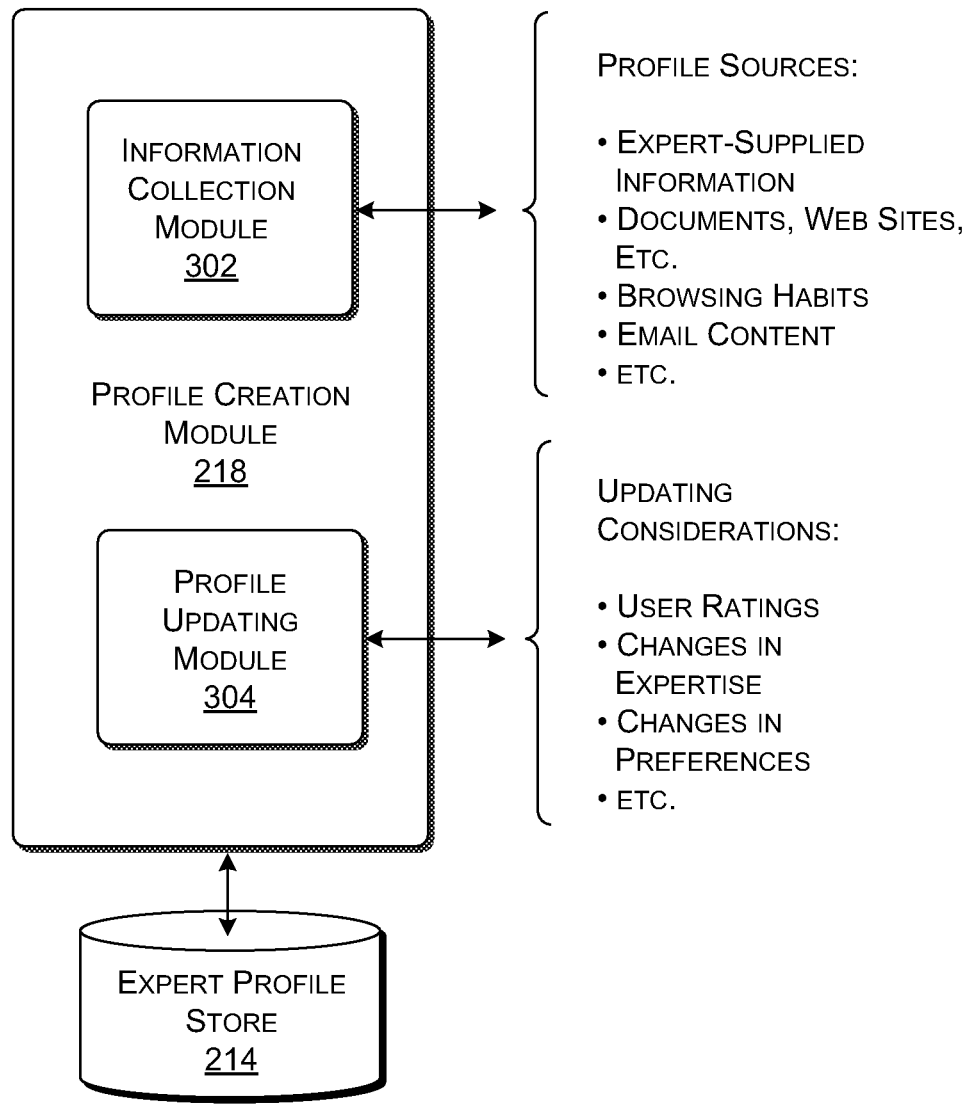
FIG. 3 shows an illustrative profile creation module for use in the question processing system of FIG. 1.

FIG. 3 shows a more detailed depiction of the illustrative profile creation module 218. The profile creation module 218 can include (or can be conceptualized to include) two modules: an information collection module 302 and a profile updating module 304.

The information collection module 302 creates a profile for a participant (who, as said, can, at any given time, act as an inquirer or an expert). The information collection module 302 can glean information regarding the participant from various sources. A first source is the participant himself or herself. For example, the participant may be asked to fill out an electronic form that includes various questions designed to identify the expertise of the participant. This form can be structured in the multiple-choice format (e.g., by asking the inquirer to "select one or more of the following topics of expertise"). In addition, the form may allow the participant to specify his or her expertise in free-form text format (whereupon the profile creation module 218 can mine the participant's answer for appropriate keywords in the manner described above in the context of the question interpolation module 210).

On a related topic, a participant may also volunteer to provide information regarding another participant of the question processing system 108. For example, assume that a team leader within an organization is providing information about his or her expertise. The team leader may also choose to create a profile for a member of his or her group, as the team leader is in a good position to assess the expertise of this person.

In addition to providing information regarding a participant's own expertise (or that of another participant), a participant can manually supply any kind of information which assists the expert routing module 212 in routing the participant's question to the appropriate expert or experts. For example, the participant can provide suggestions regarding experts that may be able to answer his or her questions. These suggestions can be structured as IF-THEN-ELSE rules, or the like, or some other format or combination of formats. For instance, the participant can specify that if a question pertains to topic X, the question should be preferably routed to expert Y or, more generally, expert class Z. Moreover, a participant can expressly prohibit her own questions from being routed to certain experts; the participant can also prohibit the receipt of questions that have been sent by certain inquirers. In this manner, the inquirer can specify a custom routing mechanism that either supplements or entirely replaces the routing functionality provided by the expert routing module 212. The participant can likewise specify any other preference information which governs the operation of the question processing system 108 in any way.

The information collection module 302 can also automatically or semi-automatically extract information that conveys the possible expertise of the participant. If so authorized by the user, the information collection module 302 can extract such information from multiple sources, such as documents authored by the participant, web sites associated with the participant, browsing behavior exhibited by the participant, Email content addressed to and/or sent by the participant, organizational charts that identify the role of the participant, social networking information associated with the participant, distribution lists which identify the participant, and so on.

In the manner described above, the information collection module 302 can mine the above-identified types of sources for telltale keywords, and then map these keywords to labels that identify the expertise of the participants. For example, the information collection module 302 can determine that a particular participant is a doctor who has authored a collection of documents regarding skin rashes. These documents may be public documents that are accessible from a network-accessible source (such as a journal database); alternatively, or in addition, these documents may be locally stored on the participant's communication module (e.g., the participant's personal computer). With authorization from the participant, the information collection module 302 can mine these documents for keywords, which allows it to conclude that the participant has an expertise in dermatology.

In addition, the information collection module 302 can extend (or propagate) the profile information associated with an initial group of experts to other participants who have a relationship with the initial group of experts. This can be performed in the manner described above, e.g., using social network information, organizational charts, and so on.

The profile updating module 304 makes changes to profiles that have been already created. In one case, the profile updating module 304 can examine the answers that have been provided by a particular participant. Based on this information, the profile updating module 304 can obtain a better idea of the expertise of this participant. In other words, if the participant is repeatedly answering detailed questions regarding dermatology, this participant likely has an expertise in dermatology. The profile updating module 304 can also glean information regarding the expertise of a participant based on the questions that he or she asks. For instance, if a participant is in the habit of asking very sophisticated questions regarding dermatology, he or she likely has knowledge in this field and is therefore likely to be able to field at least basic questions in this field.

In addition, as will be described in further detail below, an inquirer can evaluate the quality of an answer provided by an expert. The profile updating module 304 can receive the inquirer's evaluation and use it to update the profile of the expert. More specifically, the profile updating module 304 can use the evaluation to update an overall rating score associated with this expert. In one case, a single overall rating score is associated with an expert. In another case, multiple rating scores are associated with an expert, e.g., corresponding to different subject matter fields in which the expert has previously answered questions. In operation, a positive evaluation from the inquirer will make it more likely that the expert routing module 212 will route a similar question to this expert in the future. A negative evaluation from the inquirer will make it less likely that the expert routing module 212 will route a similar question to the expert. It is also possible to rate other participants of the question processing system 108 in a similar manner, e.g., by rating the performance of a person who routes questions to other experts, but does not himself answer the questions.

The overall rating score associated with an expert can be generated in various ways. In one case, the overall rating score represents an average of evaluations made by inquirers who have interacted with the expert. The question processing system 108 can alternatively, or in addition, take into consideration other factors in computing the overall rating score, such as one or more of: the expert's overall average answer time; the average number of words in the expert's responses; the average number of dialog iterations in the expert's exchanges with inquirers, etc. No limitation is placed on the factors that can be used to assess the performance of an expert.

The profile updating module 304 can also receive other updates to a participant's profile. For example, a participant may expressly change his or her profile, upon which the profile updating module 304 updates this person's profile. For example, a participant may be annoyed to find that he or she is receiving a large number of questions in a topic that he or she considers undesirable for any reason. The participant can manually change his or her profile in an attempt to prevent further questions of this nature from being routed to him or her. In a similar manner, the participant can modify other preference-related information at any time. For example, the participant can expressly block certain inquirers from sending questions to him or her. In addition, or alternatively, the participant can adjust weighting information (or the like) which influences the selection of experts, and so on.

More generally, in any of the cases described herein, a participant may be given an express choice to opt in or opt out of the collection of profile information (or any other participant-related information). In those cases in which profile information is collected, the question processing system 108 can provide appropriate safeguards to maintain the privacy the collected information. Further, the question processing system 108 can allow the participant to access the information that has been collected to make corrections to the information or delete it or disable it in its entirety. In short, the participant can maintain full ownership of profile information, defining what items of information are collected (if any), how the information is collected and maintained, and how the information is used. In this manner, the participant can customize the operation of the question processing system 108, thereby enabling the participant to gain the benefits of the system while satisfying the participant's desired level of privacy. It is also possible to route questions to experts by performing dynamic analysis of expertise, that is, at the time that each question is submitted. In this case, expertise can be determined without making reference to stored profiles. As such, in this case, the question processing system 108 can omit the storage of expert profiles.

Figure 4:
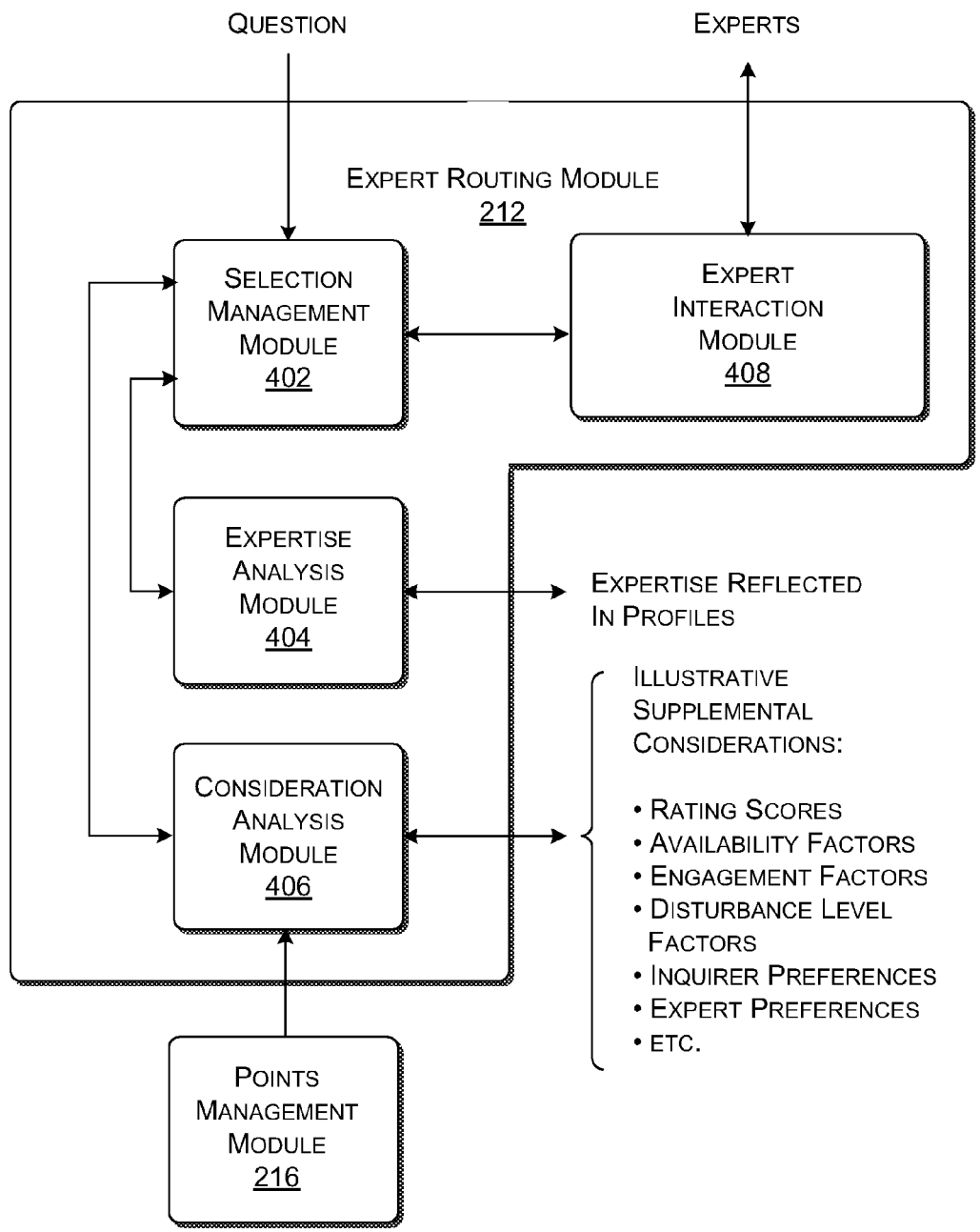
FIG. 4 shows an illustrative expert routing module for use in the question processing system of FIG. 1.

FIG. 4 shows addition details regarding the illustrative expert routing module 212 introduced in FIG. 2. To review, one purpose of the expert routing module 212 is to route questions posed by inquirers to appropriate experts. The expert routing module 212 also handles other aspects of the interaction between inquirers and experts.

The expert routing module 212 includes a selection management module 402. The selection management module 402 manages the selection of experts. To do so, the selection management module 402 may receive analysis from an expertise analysis module 404 and a consideration analysis module 406. By way of terminology, the selection management module 402 selects the experts from a pool of potential experts, referred to as expert candidates (or simply experts).

The expertise analysis module 404 matches the subject matter of the question (as determined by the question interpretation module 210) with the expertise of one or more experts. The expertise analysis module 404 can perform this operation in any of the ways described above. In one technique, the expertise analysis module 404 treats the question as a search term which is matched against a database of expert profiles in the expert profile store 214. Any search algorithm can be used to perform this matching. In another case, the expertise analysis module 404 can perform more structured searching by matching the subject matter fields identified by the question interpretation module 210 with appropriate subject matter fields in the profiles. For example, if the inquirer's question contains the word "mutual funds," the expertise analysis module can select one or more expert profiles from a general category of financial management.

As explained above, the appropriateness of an expert's expertise also depends on the level of expertise of the inquirer (as can be assessed from the inquirer's own profile). The expertise analysis module 404 will attempt to find an expert that has a greater level of expertise than the inquirer. However, in one case, the expertise analysis module 404 may wish to select an expert who is not too advanced relative to the inquirer. Two reasons may underlie this decision. First, the expertise analysis module 404 may wish to select an expert that is able to field the inquirer's question without overwhelming the inquirer with too much detail. Second, the expertise analysis module 404 may wish to judicially use the resources of truly advanced experts, e.g., by sending the most complex questions to these experts. In other words, the expertise analysis module 404 may not wish to deluge an advanced expert with too many low-level questions, as the expert may not have sufficient time to answer the truly advanced questions. Whether or not a question is "advanced" can be assessed in various ways. For instance, the difficulty of a question can sometimes be determined based on the keywords that it contains (for example, a question that seems to pertain to genetic science is likely to be advanced). The expertise analysis module 404 can also deem the question to be difficult if there have already been one or more unsuccessful attempts to find an appropriate expert.

The consideration analysis module 406 analyzes a number of other considerations that may have a bearing on the appropriateness of expert candidates to answer the question. These considerations are referred to herein as supplemental considerations because they are supplemental to the expertise-related analysis performed by the expertise analysis module 404.

One supplemental consideration is the rating score associated with each expert candidate under consideration. The consideration analysis module 406 will favor experts who have performed well in the past (as assessed by inquirers), and disfavor experts who have performed poorly.

Another supplemental consideration is an availability factor associated which each expert candidate under consideration. The availability factor of an expert candidate reflects a determination of whether the expert candidate is currently working on his or her communication module and is therefore presumably available to answer a question (if the expert candidate authorizes such a determination to be made). The availability of an expert candidate can be determined in a more fine-grained manner by making an assessment of the tasks that the expert candidate is currently performing (if the expert candidate authorizes such a determination to be made). If the expert candidate appears to be engaged in a work-related application (such as creating a document), then the consideration analysis module 406 may identify this expert candidate as unavailable, or at least having a non-preferred level of availability. In contrast, if the expert candidate appears to be merely surfing the web, then the expert candidate is considered more likely to be available to answer a question. The consideration analysis module 406 will favor expert candidates with the greatest level of availability. Participants can also explicitly control their availability status by communicating their status to the consideration analysis module 406. Participants can also expressly control the extent to which the consideration analysis module 406 is authorized to assess their status, in one case, by expressly opting out of this aspect of the question processing system 108.

Another supplemental consideration is a distraction level factor associated which each expert candidate under consideration. This type of consideration can be expressed in terms of one or more environment-specific rules. In one illustrative environment, the consideration analysis module 406 can include a rule that states that it is permissible to route m questions to an expert candidate in a span of time n (e.g., a single day, a week, etc.). This rule is itself subject to qualification. The frequency at which an expert candidate can be disturbed can vary depending on the preferences of the expert candidate, the prior question-answering habits of the expert candidate, the subject matter to which the question pertains, the time of day, the day of the week, and so on.

Another supplemental consideration is an engagement factor associated which each expert candidate under consideration. This factor conveys the extent of an expert candidate's prior engagement in asking and answering questions. For example, in one case, it is preferred to maintain a desired balance among participants such that a person who asks approximately n questions is expected to answer m questions, where, in one case n is approximately equal to m (although the question processing system 108 can maintain other kinds of balance ratios). The consideration analysis module 406 may favor expert candidates who are currently operating in a question-answering deficit, meaning that they have asked more questions than they have answered.

Another supplemental consideration pertains to the individual preferences of any nature established by the inquirer and/or the expert candidate under consideration. These individual preferences may restrict the selection of expert candidates based on any criteria.

The consideration analysis module 406 can take into account yet other types of supplemental considerations. The above-enumerated list of supplemental considerations is representative and non-exhaustive.

The selection management module 402 receives the recommendations from the expertise analysis module 404 and the consideration analysis module 406. Based thereon, the selection management module 402 makes a final decision regarding the experts to whom the question should be routed. The selection management module 402 can use any criteria in making this decision. For example, in one case, each factor in favor of selecting a particular expert is given a weight. For instance, assume that an expert's rating score is 0.8. Further assume that the selection management module 402 assigns an importance of 0.5 to this factor. In this case, the weighted contribution of this factor is 0.5×0.8. The selection management module 402 can determine the expert's total score by summing up these kinds of weighted contributions, or by performing any other kind of mathematical operation (or combination of mathematical operations), such as a multiplying operation, an averaging operation, etc. The selection management module 402 can select the n experts having the highest overall rank. This is one example; other strategies can be used.

The decision as to how many experts should be selected can itself be based on various criteria. In one case, the selection management module 402 selects multiple experts. In another case, the selection management module 402 selects a single expert. One factor that has a bearing on the number of experts that are selected is the availability of qualified experts to handle the question; if there is only one expert that can answer the question, the question may be only sent to this expert. Another factor that has a bearing on the selection is the assessed probability that a selected group of experts can answer the question. Namely, the selection management module 402 may wish to select a sufficiently large pool of experts to ensure that at least one of the experts will agree to answer the question. But the selection management module 402 may otherwise wish to prevent the question from being sent to an unnecessarily large pool of experts; this is because this approach will unnecessarily disturb a large number of experts. The probability that a group of experts will be able to answer a question can be empirically gauged based the prior performance of the experts, in optional conjunction with statistical modeling. More specifically, in one case, the selection management module 402 can investigate the prior performance of all experts in general; in another case, the selection management module 402 can examine the performance of a subset of experts who have expertise that has a bearing on the question.

Another factor that has a bearing on the selection is the history of any prior attempts to route the question to appropriate experts (if such history exists). For example, assume that the selection management 402 first sends the question to a first group of experts. If no expert answers the question, the selection management 402 may decide to expand the number experts to which it sends the question (optionally excluding the experts that received the question in the first routing attempt). In this manner, the selection management module 402 can use a dynamic or cascaded strategy to determine the number of experts to which to send the question, progressively broadening the pool of eligible experts until an expert agrees to answer the question.

The expert routing module 212 also includes an expert interaction module 408. The expert interaction module 408 handles all aspects of the interaction between the inquirer and the selected experts. In one case, the expert interaction module 408 routes the question to plural selected experts (if, in fact, plural selected experts have been selected, rather than a single expert). Presume that one expert indicates that he or she is willing to answer the question. The expert interaction module 408 responds by setting up a communication session between the inquirer and the expert. This communication session allows the inquirer and expert to engage in any interaction that is appropriate to answer the inquirer's question. For instance, the expert may ask the inquirer to clarify his or her question. The inquirer may, in turn, ask one or more follow-up questions. Other possible aspects of this interaction will be described below in the context of the discussion of FIGS. 5-11 (which develop an illustrative question-answer scenario).

In one case, the expert interaction module 408 awards the question to the first expert to respond, upon which all other experts who were notified are prevented from responding. That is, these experts are now locked out. These experts may optionally also be alerted to the fact that another expert has accepted the task of responding to the question. In another case, the expert interaction module 408 can allow multiple experts to simultaneously interact with the inquirer. This operation can be performed by setting up a chat room or the like, in which all participants of the conversation can attempt to resolve the question.

At the termination of a communication session between an inquirer and expert, the expert interaction module 408 can invite the inquirer to rate the quality of the expert and/or the answer or support that they have provided. The expert interaction module 408 can also ask the inquirer whether he or she wishes to route the same question (or a modification thereof) to another expert. The inquirer may wish to take this course of action if he or she is dissatisfied with the answer given by the first expert. The expert interaction module 408 can also ask the inquirer whether he or she wishes to post the exchange between the inquirer and expert on an electronic bulletin board or the like. This action will enable other interested inquirers to benefit from the knowledge imparted by the expert in the interaction.

FIGS. 5-11 describe an exchange between a particular inquirer and a particular selected expert (although, as stated, the system can allow the inquirer to simultaneously interact with multiple experts). In this illustrative case, the question processing system 108 conducts the inquirer-expert interchange using instant messaging (IM) functionality. That is, the communication system 110 of FIG. 1 corresponds to instant messaging functionality. Instant messaging functionality allows participants to exchange text messages and other information with each other in substantially real time. The instant messaging functionality relies on a network-accessible instant messaging system for routing messages among participants. In one case, the communication modules 202 (e.g., personal computers and the like) operated by the participants include local instant messaging functionality which enables them to interact with the network-accessible instant messaging system. In another case, the communication modules 202 store no such local instant messaging functionality; rather these local communication modules 202 can interact with the network-accessible instant messaging system as a web-based resource, e.g., via general browser functionality provided by the local communication modules 202.

Other implementations can use other types of communication systems (besides instant messaging functionality). For example, other implementations can allow participants to communicate with each other using chat room technology, telephone call technology, video conference technology, Email technology, and so on, or any combination thereof. More generally, in one case, the communication functionality can provide synchronous communication among participants (as in the case of instant message communication). In another case, the communication functionality can provide asynchronous communication among participants (as in the case of Email communication).

Figure 5:
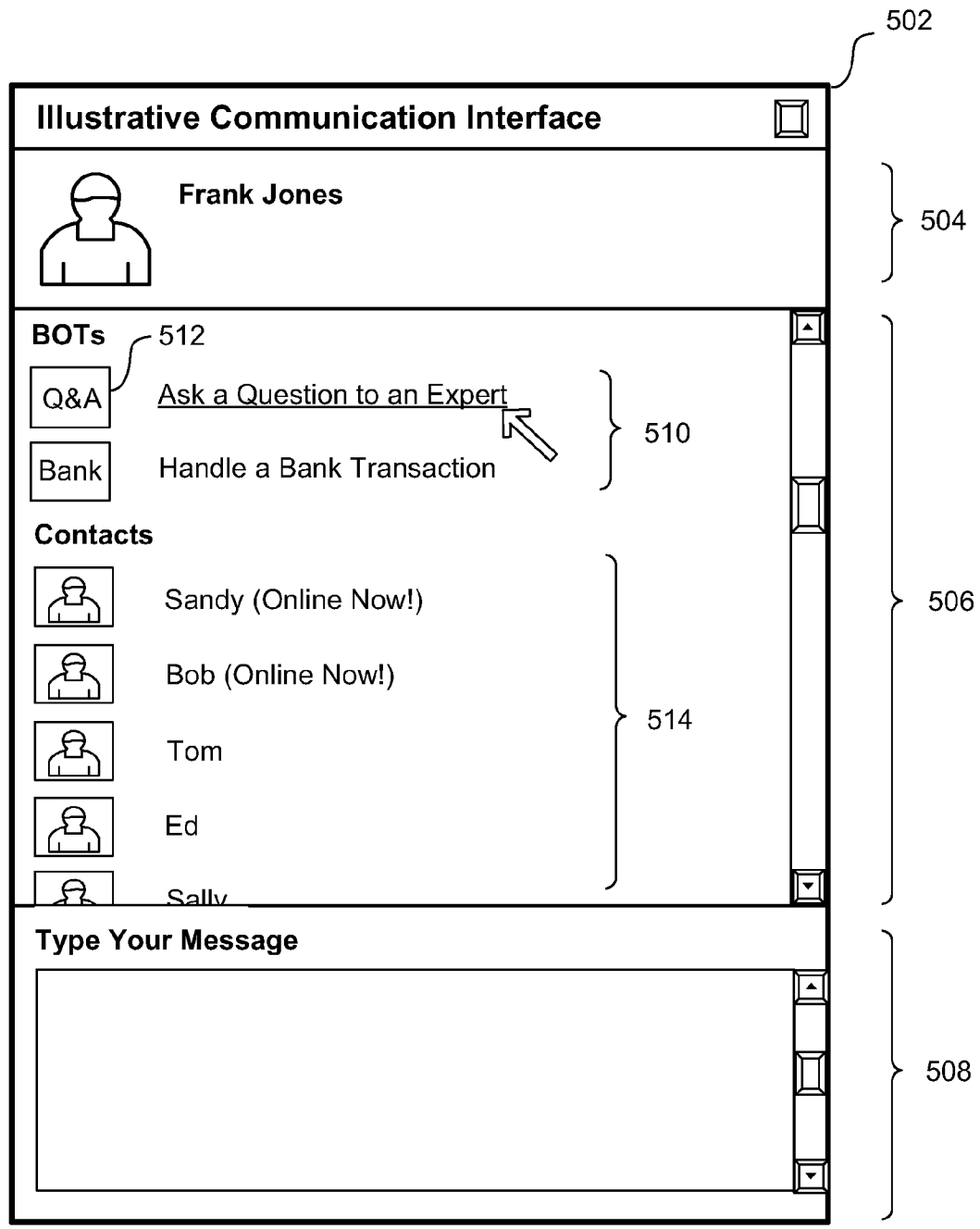
FIGS. 5-11 show a series of representative user interface presentations for conducting an exchange between an inquirer and an expert using the question processing system of FIG. 1.

FIG. 5 shows an illustrative user interface panel ("UT panel") 502 operated by a hypothetical participant, Frank Jones. The illustrative UT panel 502 includes a first section 504 that identifies salient information regarding the participant, Frank Jones. The UT panel 502 includes a second section 506 that identifies a list of contacts of the participant, with whom the participant may communicate. The UT panel 502 includes a third section 508 which presents messages exchanged between the participant, Frank Jones, and another user.

In one case, the second section 506 can identify a number of automated agents 510, referred to as BOTs, with which the participant may communicate. These automated agents 510 provide various services to the user. For example, a first agent 512 "Ask a Question to an Expert" invokes the question processing system 108 described above. The second section 506 also can identify a number of conventional contacts with whom the participant, Frank Jones, may communicate.

Presume that the participant, Frank Jones, wishes to pose a question to an expert. In other words, the participant Frank Jones wishes to act in the role of an inquirer. This inquirer, Frank Jones, can therefore proceed by activating the first agent 512, "Ask a Question to an Expert."

Figure 6:
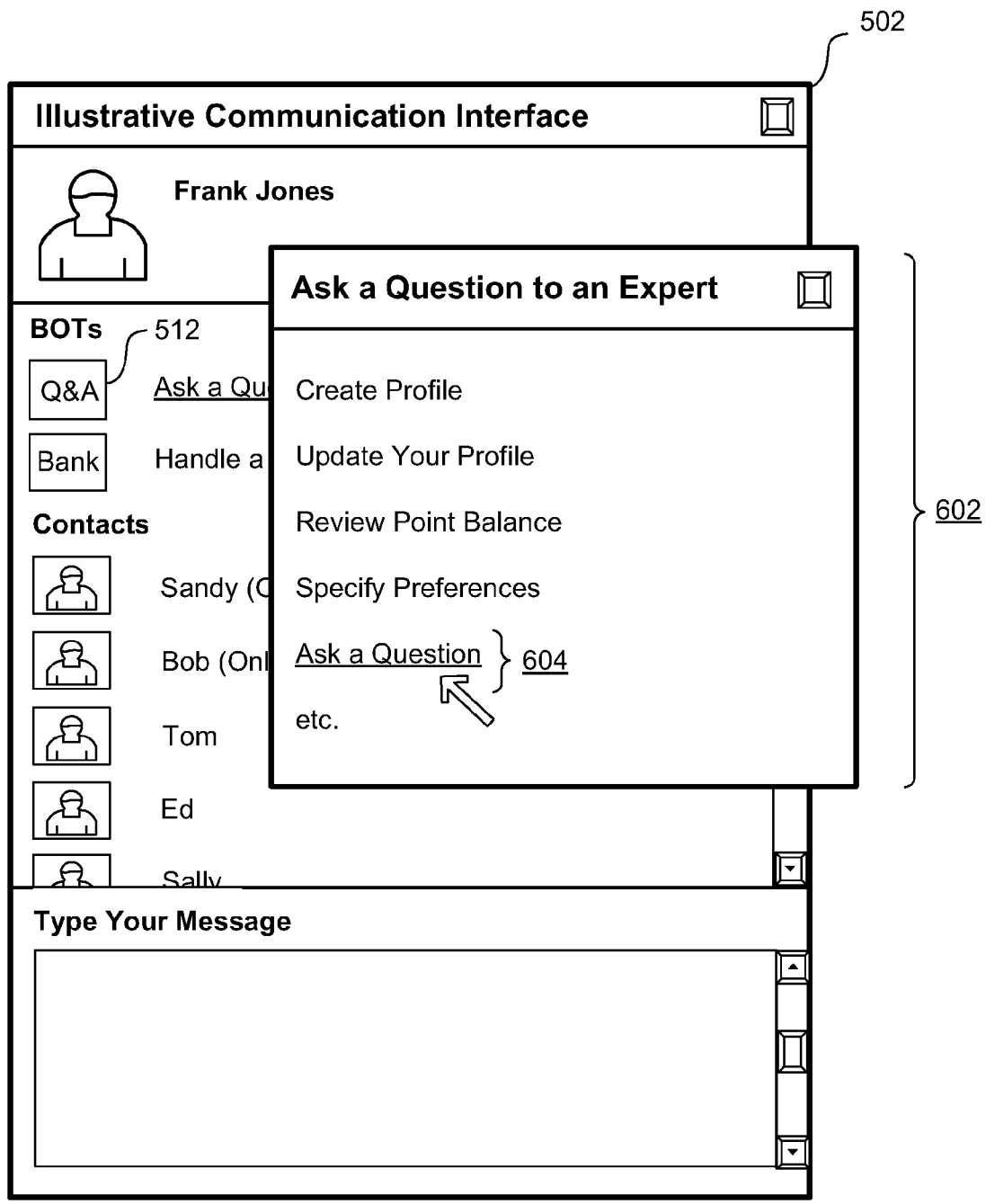

Advancing to FIG. 6, in one illustrative case, the inquirer's activation of the first agent 512 prompts the question processing system 108 to display an option panel 602 to the inquirer. The option panel 602 identifies various actions that the inquirer can take. One option allows the inquirer to create a new profile for himself, another option allows the inquirer to update an existing profile; another option allows the inquirer to review his point balance; another option allows the inquirer to specify various user preferences; another option 604 allows the inquirer to ask a question, and so on. These enumerated options are representative. Since the inquirer is interested in posing a question, assume that he activates the option 604, "Ask a Question."

Figure 7:
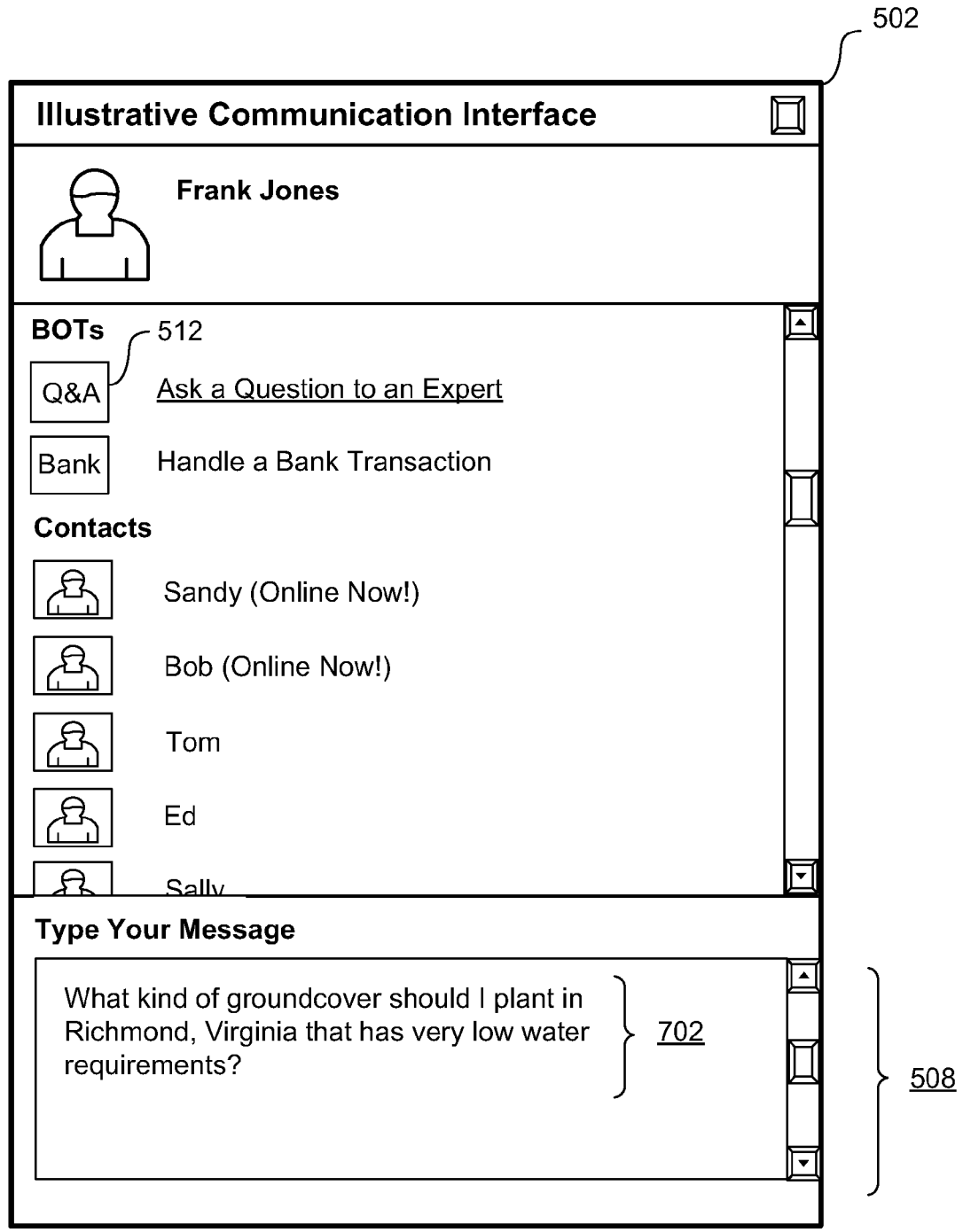

As shown in FIG. 7, the inquirer may now type his question. In this illustrative case, the inquirer types the question 702 "What kind of groundcover should I plant in Richmond, Va. that has very low water requirements?" The inquirer can type this question into the third section 508 of the UT panel 502. In another case, the UT panel 502 can provide a separate panel that allows the inquirer to compose his question. The particular question composed by this participant is in a free-form text format. Alternatively, the participant may specify his question by typing in relevant keywords, URLs, and the like. Or the inquirer may be permitted to vocalize his question, whereupon voice recognition functionality receives and processes his audible question. The inquirer can use still other techniques (or combination of techniques) for specifying the question.

Presume next that the inquirer submits his question. The question processing system 108 processes the question in the manner described above with respect to FIGS. 1-4. For example, the question interpretation module 210 can interpret the question. For example, based on the keywords, "groundcover" and "plant," the question interpretation module 210 may conclude that the question pertains to gardening. The question interpretation module 210 may further refine its interpretation by noting that the question contains location-specific information, namely the city name Richmond, Va.

The expert routing module 212 then selects one or more experts that are deemed appropriate to answer the question. It performs this task in the manner described above, e.g., by analyzing the expertise of the expert candidates, and by also taking into account various supplemental considerations. Presume that the expert routing module 212 selects n number of expert candidates. The expert interaction module 408 next sends out a request to all of the selected expert candidates.

Figure 8:
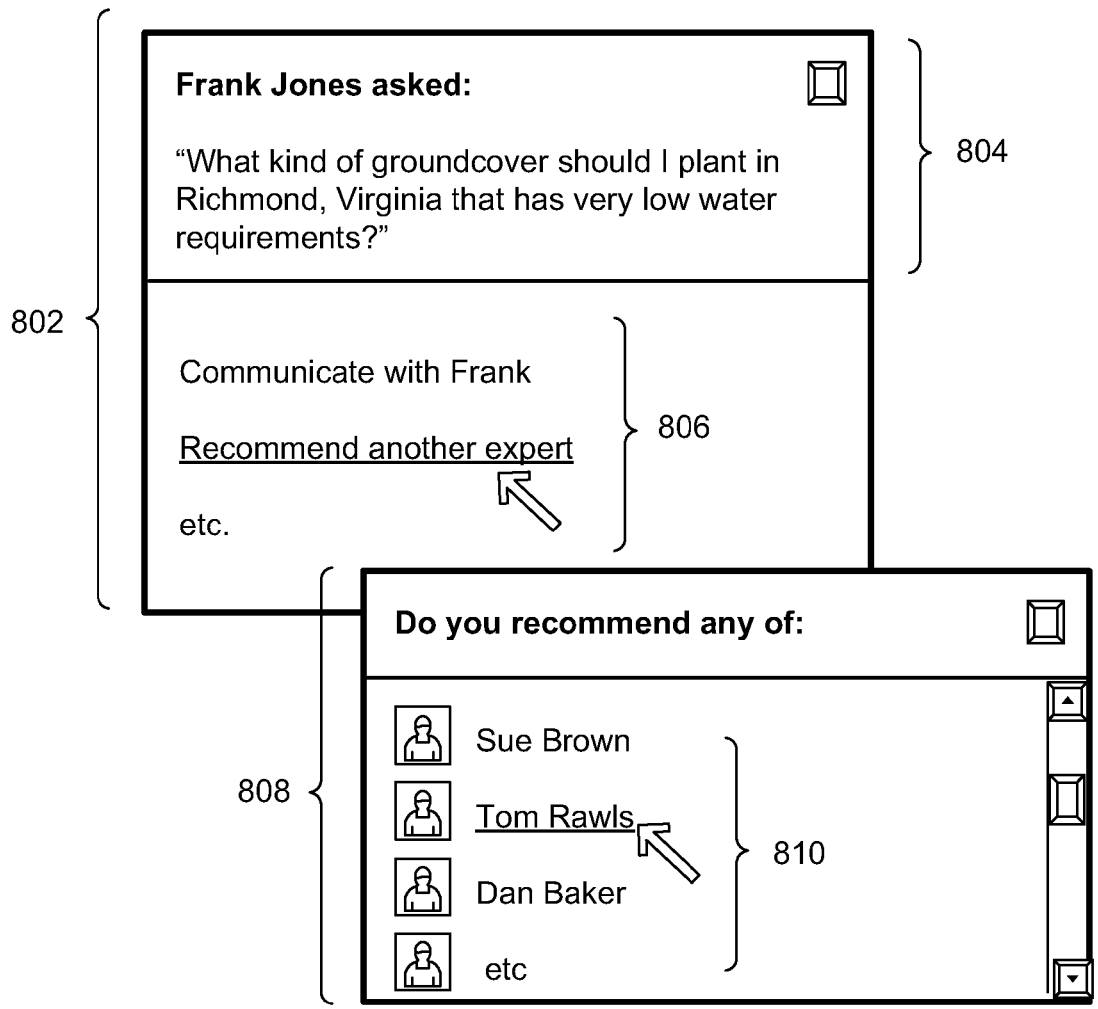

Advancing to FIG. 8, assume that the hypothetical participant, Sally McDonald, is one of the experts who has been selected by the expert routing module 212. In response, this expert may receive a message panel 802. The message panel 802 may include a first section 804 which alerts the expert to the question that has been posed, and identifies who has asked it (but in an alternative implementation, the inquirer may choose to remain anonymous). The message panel 802 may include a second section 806 which gives the expert a number of options with respect to the question. One option is to initiate communication with the inquirer. Another option is to recommend another expert. Presume that the expert, Sally McDonald, opts to recommend another expert. This may prompt the expert interaction module 408 to display another message panel 808. This message panel 808 may include a list 810 of other potential experts that Sally McDonald may choose to recommend.

Any consideration or combination of considerations can be used to compile the list 810 of other experts. In one case, the expert routing module 212 compiles this list 810 based on a standby list of available experts that may be appropriate to answer the question. The expert routing module 212 may alternatively compile the list 810 based on its determination that Sally McDonald has contacts who may be appropriate to answer the question. Still other considerations can play a part in compiling the list 810 of alternative experts. Alternatively, or in addition, the question processing system 108 can permit the expert, Sally McDonald, to recommend another expert in a more free-form fashion, such as by typing in that person's name or alias or the like.

Figure 9:
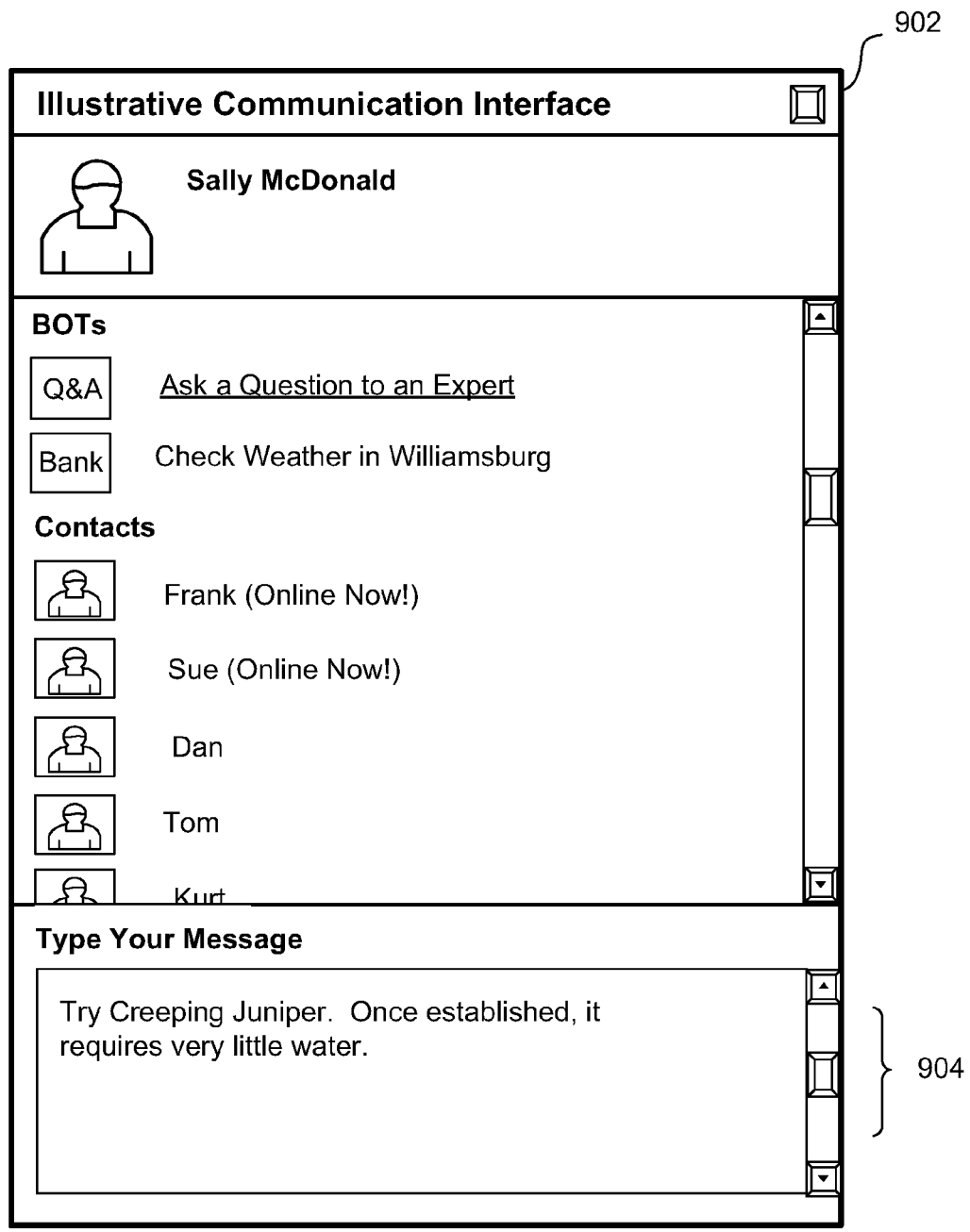

Assume that instead of recommending another expert, Sally McDonald chooses to answer the question herself. Further assume that Sally McDonald is the first of the n-contacted experts to respond, and is therefore awarded the opportunity to respond to the inquirer. Sally's decision to respond to the question causes the activation of her own IM panel 902, as shown in FIG. 9. In one case, the expert, Sally McDonald, can type a response to the question into the message exchange section 904 of her IM panel 902. The expert types the following free-form response, "Try Creeping Juniper. Once established, it requires very little water."

Figure 10:
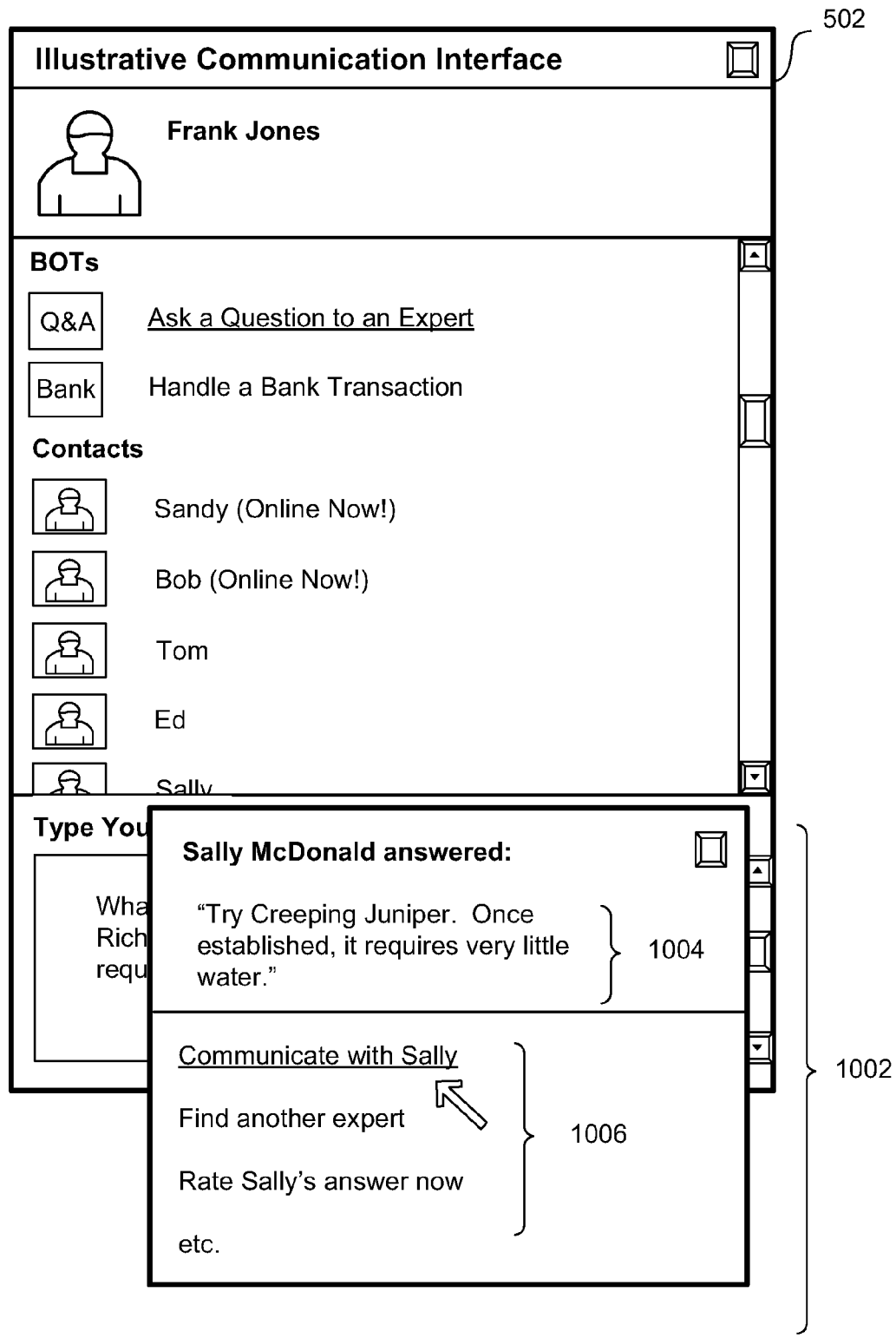
Figure 11:
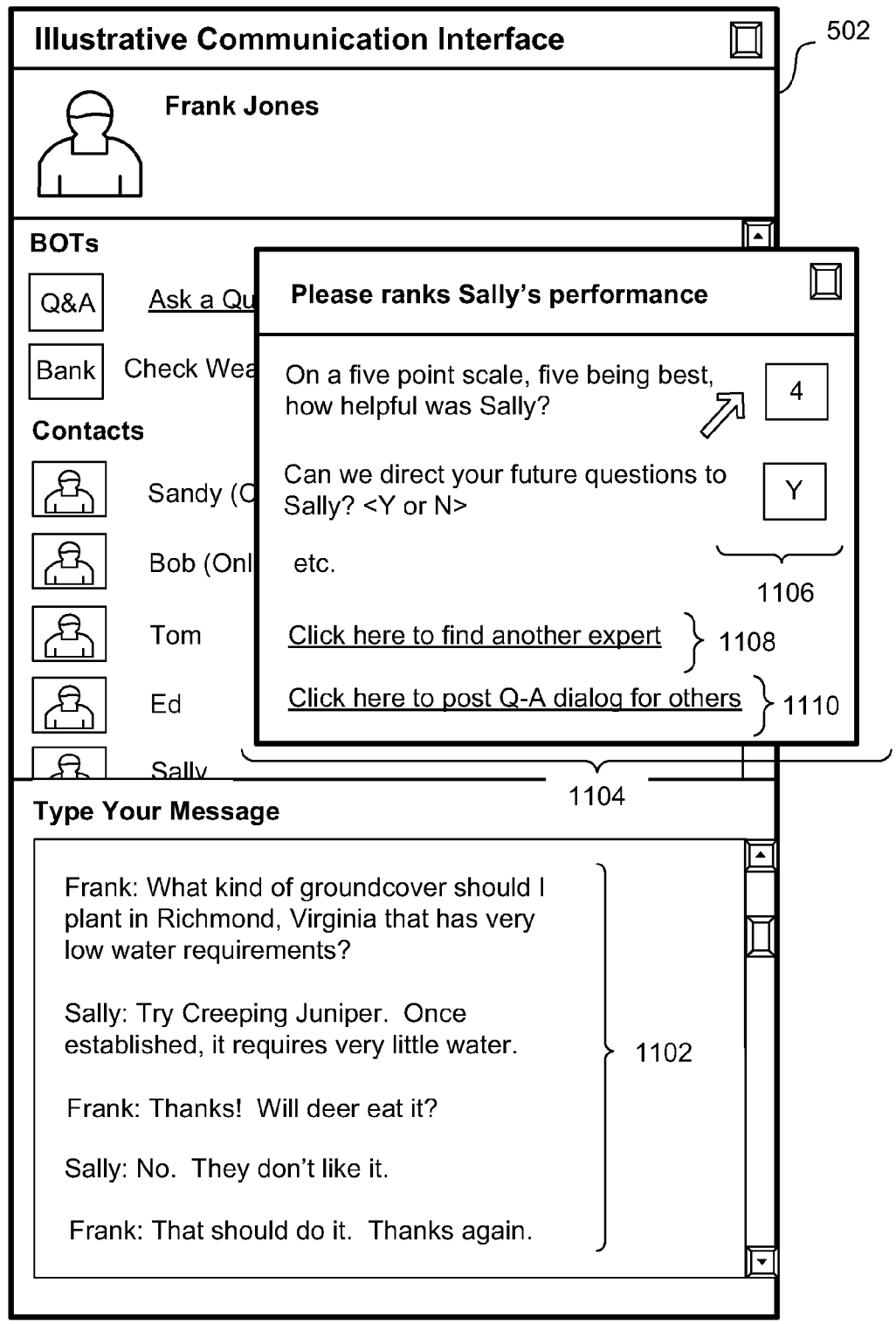

FIG. 10 shows one way in which the expert's answer can be communicated back to the inquirer. In this case, an answer panel 1002 is displayed to the inquirer, Frank Jones, alerting him to the answer 1004 to the question. The answer panel 1002 can also display the name of the expert who has responded to the question (although this information can optionally be omitted). The answer panel 1002 can also include an option section 1006 which invites the inquirer to take various actions with respect to the answer 1004. According to one option, the inquirer can opt to initiate a real-time communication session with the expert, Sally McDonald. According to another option, the inquirer can immediately reject the expert's answer and request the question processing system 108 to propose another expert. According to another option, the inquirer can opt to rate the answer provided by the expert at this point in time. The option section 1006 can provide yet additional or different options.

In an alternative case, the question routing module 212 may allow plural experts to respond to the question. In this case, the answer panel 1002 can be modified to identify the answers provided by plural experts. The inquirer can then select one or more of these experts with which to communicate.

Presume that the inquirer, Frank Jones, opts to engage in a real time communication session with the expert, Sally McDonald. Advancing to FIG. 11, assume that the inquirer and the expert take part in a brief message exchange 1102. In this message exchange 1102, the inquirer asks a follow-up question and the expert answers it. At the termination of the message exchange 1102, the expert interaction module 408 can present a follow-up panel 1104 to the inquirer, Frank Jones. The follow-up panel 1104 can include an evaluation section 1106 that invites the inquirer to evaluate the expert. This evaluation can taken any form. In the illustrative case of FIG. 11, the inquirer is asked to rate the expert on a five-point scale. The inquirer is also asked whether he wishes to outright preclude another question being sent to this expert.

As another option 1108, the follow-up panel 1104 can ask the inquirer whether he wishes to send the same question (or a modified version of the question) to another expert. The inquirer might wish to select this option 1108 if he is dissatisfied with the answer given by the first expert, or if he is simply interested in how another expert might answer. As another option 1110, the follow-up panel 1104 can ask the inquirer whether he wishes to post the message exchange 1102 to an electronic bulletin board. The posting of the message exchange 1102 to a shared forum can also be made conditional on the approval of the expert. This would allow others to benefit from the knowledge imparted in the message exchange 1102. Still additional (or different) follow-up options are possible.

It will be appreciated that the sequence of user interface presentations shown in FIGS. 5-11 is illustrative. Other implementations can vary these presentations in any manner. Moreover, as stated above, the concepts described herein can be applied to any type of communication functionality (that is, other than instant messaging communication functionality).

B. Illustrative Processes

Figure 12:
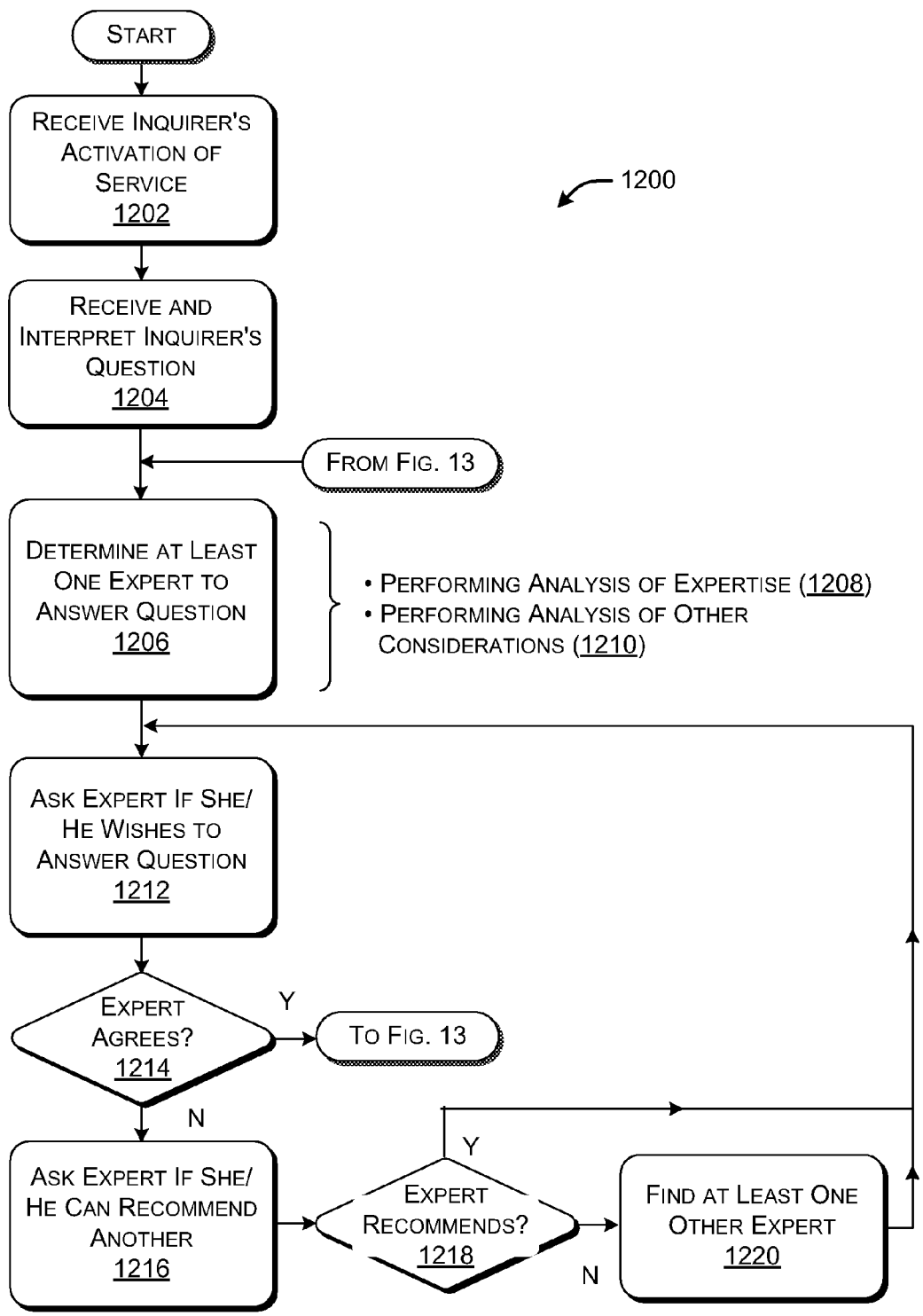
FIG. 12 is an illustrative procedure that explains how to identify an appropriate expert (or experts) to answer a question posed by an inquirer using the question processing system of FIG. 1.
Figure 13:
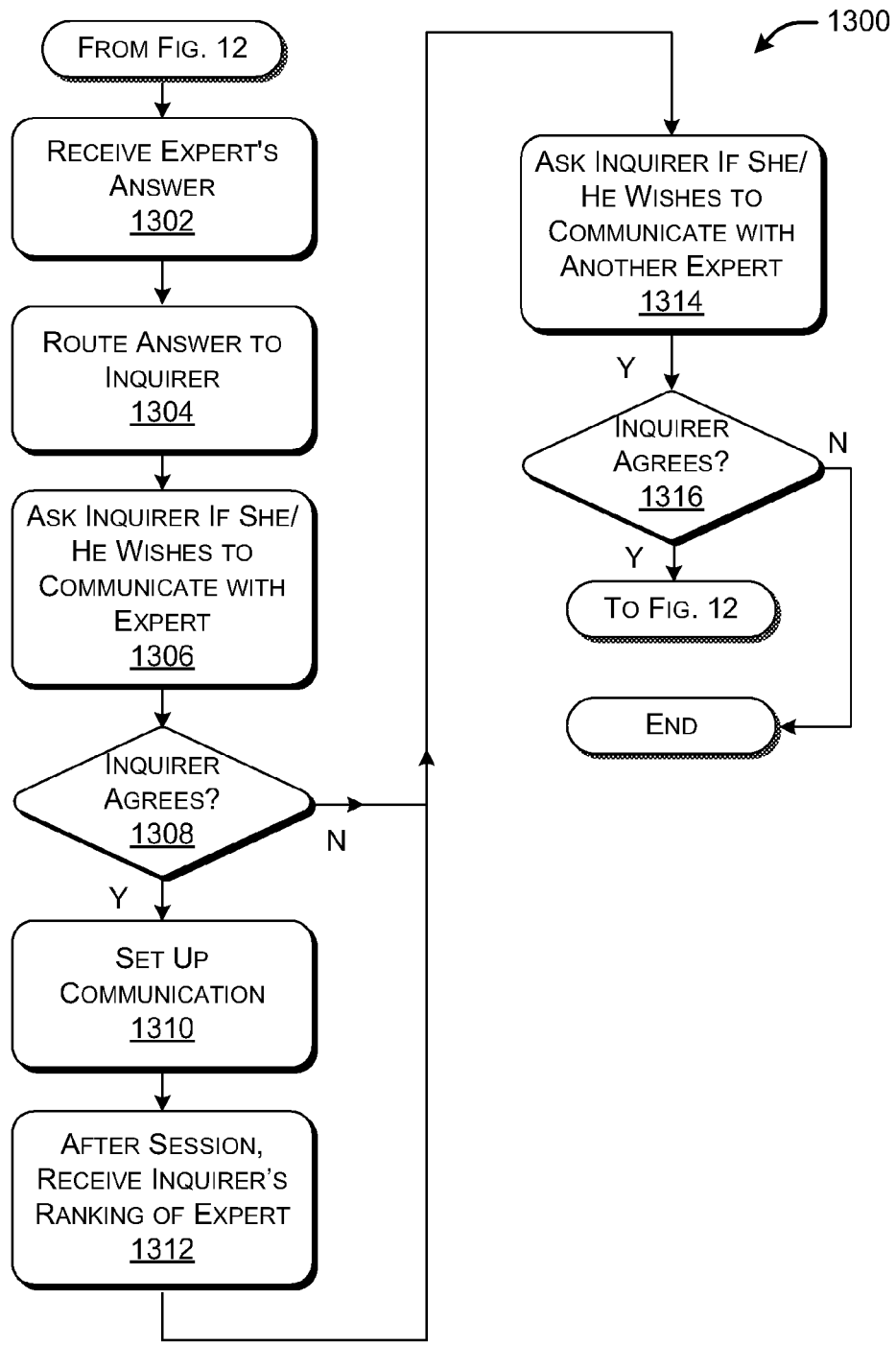
FIG. 13 is an illustrative procedure that describes an interaction between a selected expert and an inquirer using the answer processing system of FIG. 1.

FIG. 12 shows an illustrative procedure 1200 which explains how the question processing system 108 can process an inquirer's question and select one or more experts to answer the question. FIG. 13 shows an illustrative procedure 1300 which explains one manner of interaction between the inquirer and a selected expert. FIGS. 12 and 13 explain the operation of the question processing system 108 from the perspective of the question processing system 108. Since the principles underlying the operation of the question processing system 108 have already been described in Section A, this section will serve as a summary of the operation of the question processing system 108.

Starting with FIG. 12, in block 1202, the question processing system 108 receives the inquirer's activation of the services provided by the question processing system 108. This operation may correspond to the inquirer selecting the "Ask a Question to an Expert" first agent 512 shown in FIG. 5.

In block 1204, the question processing system 108 receives and interprets the inquirer's question. Interpretation may comprise determining the subject matter to which the question pertains in the manner explained above.

In block 1206, the question processing system 108 determines at least one expert to answer the question. The question processing system 108 can perform this task in the manner described above by performing analysis of the expertise of a plurality of expert candidates (in sub-block 1208) and by performing analysis of other supplemental considerations (in sub-block 1210).

In block 1212, assume that only one expert has been selected. In this block, the question processing system 108 asks the expert whether he or she wishes to answer the question.

In block 1214, assume that the expert agrees to answer the question. This invokes a process that will be described with respect to FIG. 13.

If the expert declines to answer the question, in block 1216, the expert processing system 108 asks the expert if he or she wishes to recommend another expert. In this role, the expert acts as a message router. In one case, the question processing system 108 can facilitate this routing operation by offering the router a list of suggested experts. This enables the router to recommend another expert without having to independently recall the identity of that other expert. Block 1216 need not follow block 1212 in temporal order; in another case, as illustrated in FIG. 8, both options ("Communicate with Frank," and "Recommend another expert") can be conveyed to the expert at the same time.

In block 1218, it is determined if the expert has recommended another expert. If this is so, then the process may return to block 1212, where the newly recommended expert is asked if he or she wishes to answer the question.

If the first-selected expert declines to recommend another expert (as determined in block 1218), then, in block 1220, the expert routing module 212 may attempt to independently find another expert to contact.

Advancing to FIG. 13, assume that the first-selected expert has agreed to answer the question and does in fact answer the question. Then, in block 1302, the question processing system 108 receives the expert's answer.

In block 1304, the question processing system 108 routes the answer to the inquirer.

In block 1306, the question processing system 108 asks the inquirer whether the inquirer wishes to engage in a real-time communication session with the expert. The inquirer can make this decision based on the assessed quality of the expert's response.

In block 1308, the question processing system 108 determines whether the inquirer has agreed to communicate with the expert.

In block 1310, if the inquirer has agreed to communicate with the expert, then the question processing system 108 sets up the communication and subsequently handles the message exchange between the inquirer and the expert.

In block 1312, at the termination of the message exchange, the question processing system 108 can invite the inquirer to evaluate the quality of the expert's performance, and then can receive the inquirer's evaluation. The evaluation can take the form, in part, of assigning a rating score to the expert. Further, although not shown, the inquirer may be given the opportunity to evaluate the expert even in the circumstance in which the inquirer declines to open a communication session with the expert.

In block 1314, the question processing system 108 can invite the inquirer to select another expert.

In block 1316, the question processing system 108 determines whether the inquirer wishes to communicate with another expert. If so, the processing flow returns to the operations described in FIG. 12.

It should be appreciated that the sequence of operations described in FIGS. 12 and 13 are illustrative. Other implementations can vary the operations described above in any manner, e.g., by changing the order of the illustrated operations, adding new operations, omitting operations, and so on.

C. Representative Processing Functionality

FIG. 14 sets forth illustrative electrical data processing functionality or equipment 1400 (simply "processing functionality" below) that can be used to implement any aspect of the functions described above. With reference to FIG. 2, for instance, the type of processing functionality 1400 shown in FIG. 14 can be used to implement any aspect of the question processing system 108. The type of processing functionality 1400 shown in FIG. 14 can also be used to implement any aspect of the communication modules 202.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, or elsewhere). More generally, instructions and other information can be stored on any computer-readable medium 1410, including, but not limited to, static memory storage devices, magnetic storage devices, optical storage devices, and so on. The term "computer-readable medium also encompasses plural storage devices. The term computer-readable medium also encompasses signals transmitted from a first location to a second location, e.g., via wire, cable, wireless transmission, etc.

The processing functionality 1400 also includes an input/output module 1412 for receiving various inputs from a user (via input modules 1414), and for providing various outputs to the user (via output modules). One particular output mechanism may include a presentation module 1416 and an associated graphical user interface (GUI) 1418. The processing functionality 1400 can also include one or more network interfaces 1420 for exchanging data with other devices via one or more communication conduits 1422. One or more communication buses 1424 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
tracking a number of questions asked by an inquirer, the inquirer being one of a plurality of participants of an electronic question processing system;
tracking a number of answers to questions answered by the inquirer at the electronic question processing system;
receiving a question from the inquirer;
determining whether the number of questions asked by the inquirer and the number of answers to questions answered by the inquirer are in balance;
if the number of questions asked by the inquirer and the number of answers to questions answered by the inquirer are in balance:
  determining a person to answer the question, the person being another of the plurality of participants of the electronic question processing system; and
  routing the question from the inquirer to a device associated with the person; and
if the number of questions asked by the inquirer and the number of answers to questions answered by the inquirer are not in balance, preventing the question from the inquirer from being routed.

2. The method of claim 1, further comprising interpreting the question to determine a subject matter to which the question pertains, and wherein if the number of questions asked by the inquirer and the number of answers to questions answered by the inquirer are in balance, then the person determined to answer the question comprises an expert in the subject matter.

3. The method of claim 1, wherein the determining the person to answer the question comprises determining a plurality of experts that are deemed appropriate to answer the question, the method further comprising routing the question to the plurality of experts.

4. The method of claim 1, wherein the determining the person to answer the question comprises performing an analysis of expertise associated with individual ones of a plurality of candidates, and selecting the person from among the plurality of candidates based on the analysis of the expertise.

5. The method of claim 4, wherein the analysis of the expertise comprises determining the expertise of individual ones of the plurality of candidates relative to a baseline of expertise possessed by the inquirer.

6. The method of claim 4, wherein the determining the person to answer the question further comprises performing an analysis with respect to at least one supplemental consideration pertaining to individual ones of the plurality of the candidates.

7. The method of claim 6, wherein the at least one supplemental consideration corresponds to an availability factor associated with each candidate, the availability factor for a particular candidate indicating whether the particular candidate is available to answer the question.

8. The method of claim 6, wherein the at least one supplemental consideration corresponds to a rating score associated with each candidate, the rating score for a particular candidate being based on prior performance of the particular candidate.

9. The method of claim 8, wherein the prior performance of the particular candidate is based on one or more of evaluations made by a group of inquirers with whom the particular candidate has interacted or at least one statistical characteristic associated with answers provided by the particular candidate.

10. The method of claim 6, wherein the at least one supplemental consideration corresponds to a personal engagement balance factor associated with each candidate, the personal engagement balance factor for a particular candidate conveying a degree of prior engagement of the particular candidate in asking and answering prior questions, wherein a balance of information exchange is achieved, at least in part, by managing the degree of prior engagement.

11. The method of claim 10, wherein the degree of prior engagement of the particular candidate is gauged based on credit earned by the particular candidate, wherein the particular candidate earns credit by answering a question, and the expert candidate can expend credit by asking a question.

12. The method of claim 1, wherein if the number of questions asked by the inquirer and the number of answers to questions answered by the inquirer are in balance, the method further comprises:
receiving a recommendation from the person that an expert is appropriate to answer the question; and
routing the question to the expert.

13. The method of claim 12, further comprising providing the person with a suggestion regarding one or more experts to answer the question, wherein the recommendation made by the person is based on the suggestion.

14. The method of claim 1, wherein if the number of questions asked by the inquirer and the number of answers to questions answered by the inquirer are in balance, the method further comprises initiating a communication session between the inquirer and the person if the person agrees to answer the question.

15. The method of claim 1, wherein if the number of questions asked by the inquirer and the number of answers to questions answered by the inquirer are in balance, the method further comprises receiving an evaluation by the inquirer of the person, and using the evaluation to adjust a rating score associated with the person, the rating score comprising one factor that governs routing of questions to the person in the future.

16. The method of claim 1, wherein if the number of questions asked by the inquirer and the number of answers to questions answered by the inquirer are in balance, the method further comprises providing the inquirer an opportunity to share information provided by the person to at least one other potential inquirer.

17. One or more computer-readable storage devices storing computer-readable instructions that, when executed on one or more processing devices, perform operations comprising:
tracking a number of questions received from a first participant in an electronic question processing system;
tracking a number of answers to questions received from the first participant in the electronic question processing system;
receiving a question from the first participant in the electronic question processing system;
before routing the question to a second participant in the electronic question processing system, determining that the number of questions received from the first participant and the number of answers to questions received from the first participant are in balance;
identifying the second participant as an expert deemed appropriate to answer the question; and
routing the question to the second participant or a device associated with the second participant.

18. An electronic question processing system for routing a question over a communication system, comprising:
one or more processors;
a profile creation module executable by the one or more processors to create respective profiles for a plurality of participants of the electronic question processing system;
a selection module executable by the one or more processors to receive a question from a first participant, select a second participant to answer the question based on the respective profiles provided by the profile creation module, and route the question to the second participant, wherein the selection module routes the question to the second participant if a number of questions previously received from the first participant is in balance with a number of answers of questions previously provided by the first participant and the selection module prevents the question from being routed to the second participant if the number of questions previously received from the first participant is not in balance with the number of answers of questions previously provided by the first participant; and
a management module executable by the one or more processors to determine whether the number of questions previously received from the first participant is in balance with the number of answers to questions previously provided by the first participant.

19. The electronic question processing system of claim 18, wherein the communication system is a synchronous communication system.

20. The electronic question processing system of claim 18, wherein the communication system is an asynchronous communication system.

21. The electronic question processing system of claim 18, wherein credit that contributes to the balance is awarded to the first participant for non-question answering actions including at least one of recommending an expert, providing useful profile information, or providing a useful evaluation of an expert.

\* \* \* \* \*